United States Patent
Suzuki et al.

(10) Patent No.: US 9,483,101 B2
(45) Date of Patent: Nov. 1, 2016

(54) MULTICORE PROCESSOR SYSTEM AND POWER CONTROL METHOD

(71) Applicant: FUJITSU LIMITED, Kawasaki-shi, Kanagawa (JP)

(72) Inventors: Takahisa Suzuki, Kawasaki (JP); Koichiro Yamashita, Hachioji (JP); Hiromasa Yamauchi, Kawasaki (JP); Koji Kurihara, Kawasaki (JP); Fumihiko Hayakawa, Kawasaki (JP); Naoki Odate, Akiruno (JP); Tetsuo Hiraki, Kawasaki (JP); Toshiya Otomo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 490 days.

(21) Appl. No.: 13/916,039

(22) Filed: Jun. 12, 2013

(65) Prior Publication Data

US 2013/0275790 A1    Oct. 17, 2013

Related U.S. Application Data

(63) Continuation of application No. PCT/JP2010/073221, filed on Dec. 22, 2010.

(51) Int. Cl.
  *G06F 1/32* (2006.01)
  *G06F 9/52* (2006.01)

(52) U.S. Cl.
  CPC .............. *G06F 1/324* (2013.01); *G06F 1/3243* (2013.01); *G06F 9/526* (2013.01); *Y02B 60/1217* (2013.01); *Y02B 60/1239* (2013.01)

(58) Field of Classification Search
  None
  See application file for complete search history.

(56) References Cited

U.S. PATENT DOCUMENTS

| | | | |
|---|---|---|---|
| 2001/0011356 A1* | 8/2001 | Lee | G06F 1/3203 713/322 |
| 2002/0087896 A1* | 7/2002 | Cline | G06F 1/3203 713/300 |
| 2004/0193935 A1 | 9/2004 | Kato et al. | |
| 2007/0255929 A1 | 11/2007 | Kasahara et al. | |
| 2008/0288796 A1 | 11/2008 | Nakamura et al. | |
| 2010/0162256 A1 | 6/2010 | Branover et al. | |

FOREIGN PATENT DOCUMENTS

| | | |
|---|---|---|
| JP | 06-161872 A | 6/1994 |
| JP | 2000-148712 A | 5/2000 |
| JP | 2003-256069 A | 9/2003 |
| JP | 2004-310756 A | 11/2004 |
| JP | 2006-293768 A | 10/2006 |
| JP | 2007-114856 A | 5/2007 |
| JP | 2008-287592 A | 11/2008 |

OTHER PUBLICATIONS

Extended European Search Report of related European Patent Application No. 10861165.8 dated Aug. 29, 2016.

* cited by examiner

*Primary Examiner* — Kim Huynh
*Assistant Examiner* — Joshua Neveln
(74) *Attorney, Agent, or Firm* — Arent Fox LLP

(57) ABSTRACT

A multicore processor system includes multiple processors; a device; a memory that stores information of voltage and clock frequency for minimizing power consumption in connection with a number of the processors accessing to the device; and a power control unit that controls the voltage and the clock frequency of the processors on the basis of the information stored in the memory if the number of the processors accessing to the device changes.

7 Claims, 22 Drawing Sheets

$$P = \sum_{i=0}^{N} P_{CPUi}(f_{CPUi}) + P_{MEM}(f_{MEM}) + P_{BUS}(f_{BUS})$$
$$+ \sum_{i=0}^{M} P_{DEVi}(f_{DEVi}) + \sum_{i=0}^{L} P_{DEVi}(f_{DEVi}) + P_{PMU} \quad \cdots (1)$$

FIG.19

| CONTENDED ACCESS COUNT Ch | | | | CPU CLOCK FREQUENCY [MHz] | DEVICE CLOCK FREQUENCY | | | | 1901 |
|---|---|---|---|---|---|---|---|---|---|
| DEVICE #H0 | DEVICE #H1 | ... | DEVICE #HM | | DEVICE #H0 | DEVICE #H1 | ... | DEVICE #HM | |
| 2 | 0 or 1 | ... | 0 or 1 | 500 | 600 | 400 | ... | 400 | |
| 3 | 0 or 1 | ... | 0 or 1 | 250 | 800 | 400 | ... | 400 | |
| ... | ... | ... | ... | ... | ... | ... | ... | ... | |
| 0 or 1 | 2 | ... | 0 or 1 | 500 | 400 | 600 | ... | 400 | |
| 0 or 1 | 3 | ... | 0 or 1 | 250 | 400 | 800 | ... | 400 | |
| ... | ... | ... | ... | ... | ... | ... | ... | ... | |
| 2 | 2 | ... | 0 or 1 | 250 | 600 | 600 | ... | 400 | |
| 2 | 3 | ... | 0 or 1 | 200 | 600 | 800 | ... | 400 | |
| ... | ... | ... | ... | ... | ... | ... | ... | ... | |
| N | N | ... | 2 | 100 | 1000 | 1000 | ... | 600 | |
| ... | ... | ... | ... | ... | ... | ... | ... | ... | |
| N | N | ... | N | 50 | 1000 | 1000 | ... | 1000 | |

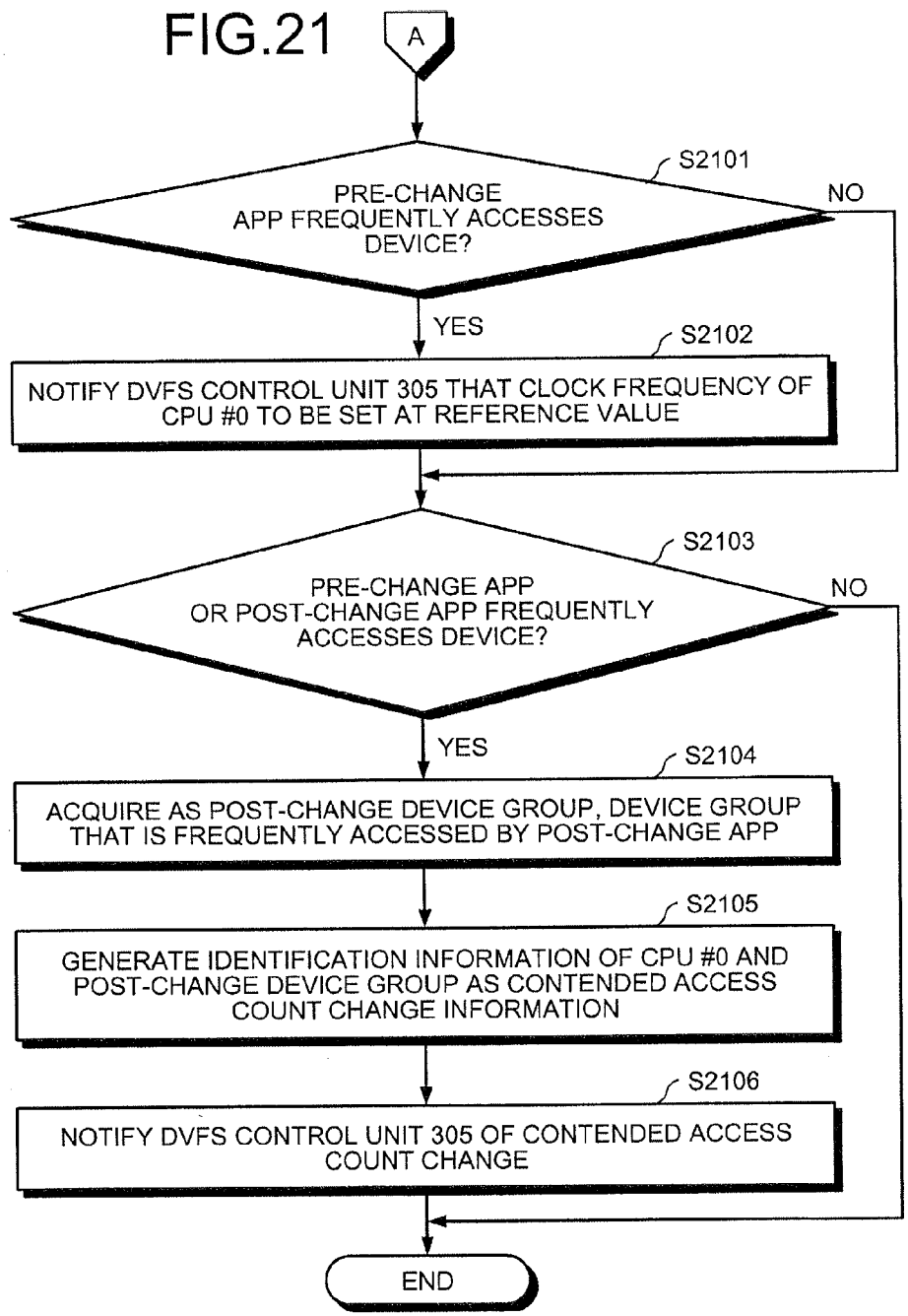

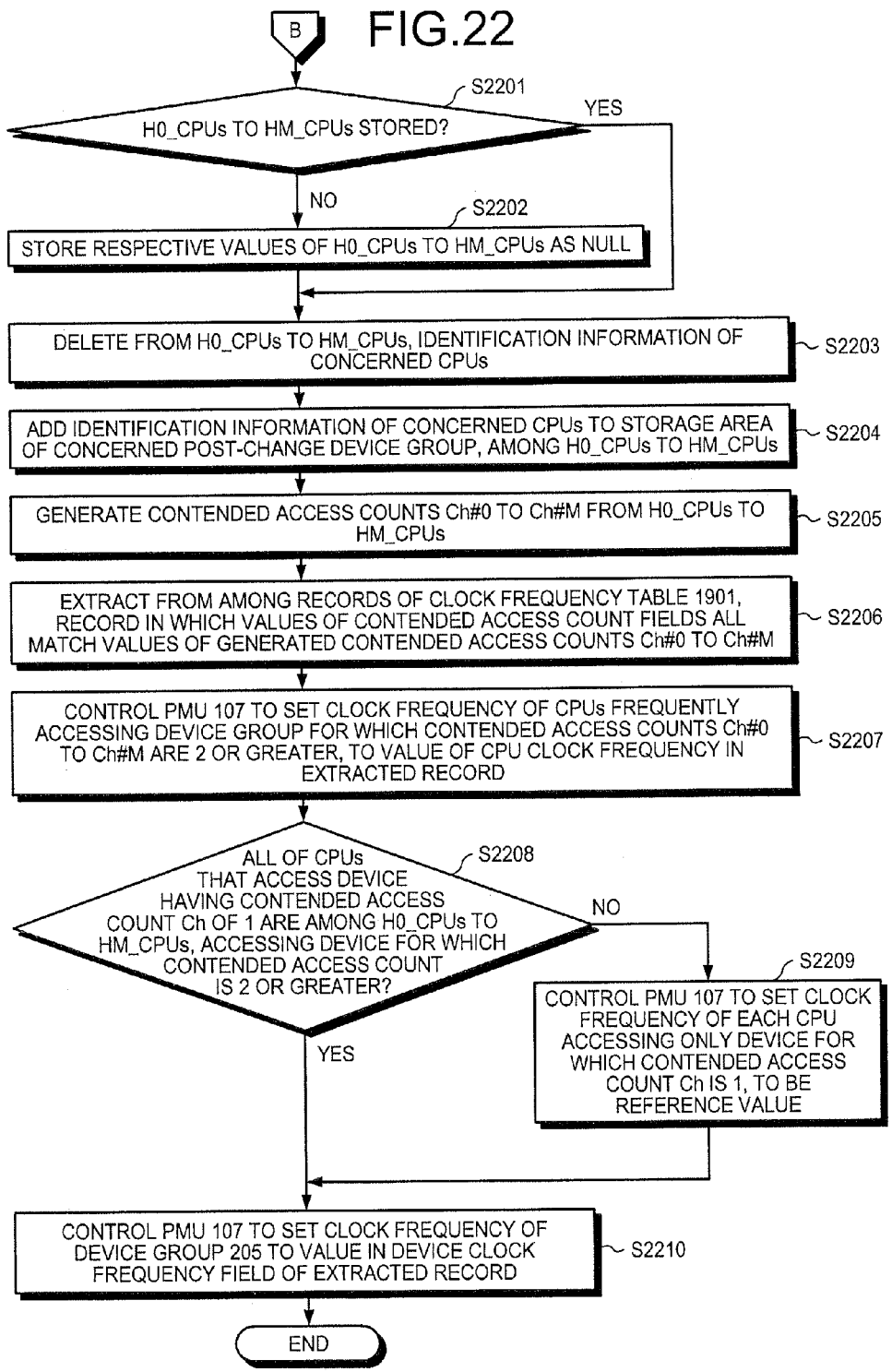

MULTICORE PROCESSOR SYSTEM AND POWER CONTROL METHOD

CROSS REFERENCE TO RELATED APPLICATIONS

This application is a continuation application of International Application PCT/JP2010/073221, filed on Dec. 22, 2010 and designating the U.S., the entire contents of which are incorporated herein by reference.

FIELD

The embodiments discussed herein are related to a multicore processor system and a power control method that control power.

BACKGROUND

Recently, devices adopting a multicore processor system configuration in which a single system has multiple cores are increasing. In a multicore processor system, the cores operate simultaneously, and therefore, have the potential of accessing the same device. When access contention occurs with respect to a device, an arbitration method by hardware or by software is performed in the multicore processor system.

An arbitration method by hardware, for example, is a method that uses an arbitration circuit. The arbitration circuit, for example, is disposed at the input/output port of the memory, which is one of the devices, and arbitrates access of the memory by the cores. In the arbitration method by hardware, the hardware performs the arbitration irrespective of software executed by a core not particularly performing any arbitration. For example, after a given core has acquired the access right to a device subject to arbitration, if the hardware that performs the arbitration receives from another core, an access request for the device, the hardware causes other core to wait until the given core has completed access and released the access right.

An arbitration method by software, for example, uses an exclusive access control function provided by an operating system (OS) of the multicore processor system and the software performs arbitration such that one core at a time accesses a device subject to arbitration. An arbitration method by software is applied, for example, when multiple cores access the same area of memory, or when a peripheral device such as a direct memory access controller (DMAC) or an image device such as a display are simultaneously accessed by multiple cores.

Nonetheless, irrespective of whether the arbitration method by hardware or software is performed, a core that has not obtained the access right has to wait until the access right is released and therefore, the processing performance of multicore processor system drops. Consequently, technology that circumvents access contention and prevents drops in processing performance have been disclosed.

For example, as an arbitration method by hardware, a technique has been disclosed that by OS scheduling, schedules processes that frequently access memory to not be executed simultaneously. Further, as an arbitration method by software, a technique has been disclosed that with respect to processes executed in parallel, even if acquisition of the access right fails, state transitions are regarded as executable states and are not put on standby, whereby the number of state transitions is reduced and the overhead accompanying state transitions is reduced (see, for example, Japanese Laid-Open Patent Publication Nos. 2000-148712 and H6-161872).

Recently, dynamic voltage and frequency scaling (DVFS) technology has been disclosed that varies clock frequency and voltage to realize reduced power consumption. DVFS separates the multicore processor system into units called power domains and varies the clock frequency and voltage according to domain. Use of DVFS enables the clock frequency and voltage of cores having a low load to be reduced to effect lower power consumption, or the clock frequency and voltage of cores having a high load to be increased to effect improved processing performance of the multicore processor system (see, for example, Japanese Laid-Open Patent Publication Nos. 2006-293768 and 2003-256069).

Nonetheless, among the technologies above, with the techniques according to Japanese Laid-Open Patent Publication Nos. 2000-148712 and H6-161872, neither contention nor overhead can be reduced and thus, a problem arises in that drops in performance occur. For example, among executable processes, if all the processes are processes that frequently access memory, irrespective of the scheduling that the multicore processor system performs, access contention occurs and processing performance decreases. Further, with the techniques according to Japanese Laid-Open Patent Publication Nos. 2006-293768 and 2003-256069, if DVFS technology is applied when contention occurs, a problem arises in that only two options are available, decrease the processing ability of an area having a low load or increase the processing ability of an area having a high load.

SUMMARY

According to an aspect of an embodiment, a multicore processor system includes multiple processors; a device; a memory that stores information of voltage and clock frequency for minimizing power consumption in connection with a number of the processors accessing to the device; and a power control unit that controls the voltage and the clock frequency of the processors on the basis of the information stored in the memory if the number of the processors accessing to the device changes.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 19 is a diagram of an example of the contents of a clock frequency table 1901 in a second embodiment;

FIG. 21 is a flowchart of the second part of the process of the scheduling unit 303 in the second embodiment; and FIG. 22 is a flowchart of the second part of the process of the DVFS control unit 305 in the second embodiment.

DESCRIPTION OF EMBODIMENTS

Preferred embodiments of a multicore processor system and a power control method will be described in detail with reference to the accompanying drawings.

Figure 1:
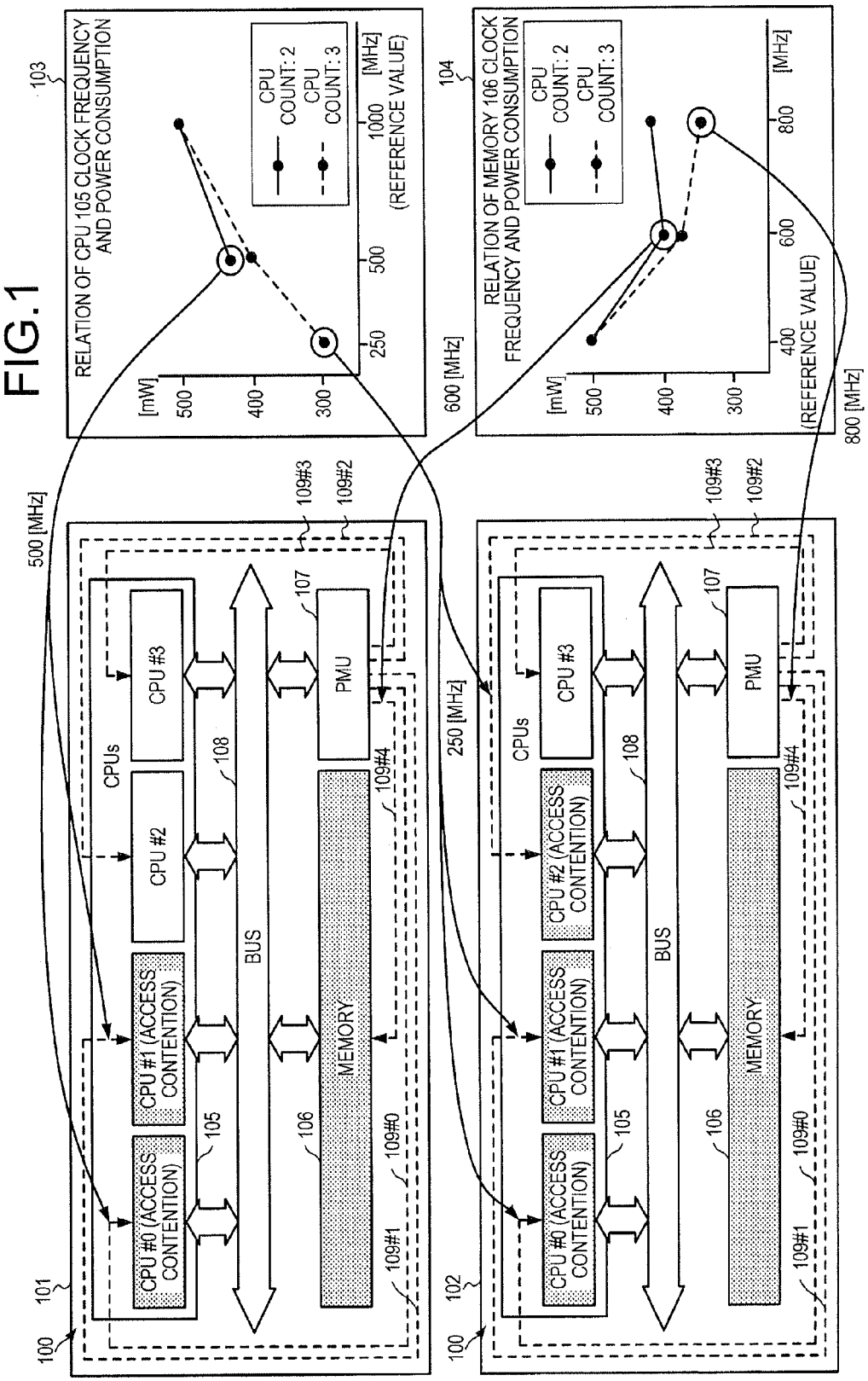
FIG. 1 is a diagram depicting operation of a multicore processor system 100 according to a first embodiment during access contention.

FIG. 1 is a diagram depicting operation of a multicore processor system 100 according to a first embodiment during access contention. Reference numeral 101 depicts a state where in the multicore processor system 100, two central processing units (CPU) cause access contention. Further, reference numeral 102 depicts a state where in the multicore processor system 100, 3 CPUs cause access contention.

The multicore processor system 100 includes multiple CPUs 105, memory 106 that is a storage device accessed by the CPUs 105, and a power control unit (hereinafter, power management unit (PMU)) 107 that manages power consumption, respectively connected by a bus 108. The CPUs 105 include a CPU #0 to a CPU #3. The CPUs 105 may include 2 or more CPUs. Further, the PMU 107 supplies a clock to the CPUs 105 and the memory 106 via a clock line 109#0 to a clock line 109#4. Hardware of the multicore processor system 100 will be described in detail with reference to FIG. 2.

Graph 103 depicts the relation between clock frequency of the CPUs 105 and power consumption during access contention at the memory 106. Graph 104 depicts clock frequency and power consumption of the memory 106 during contention at the memory 106. In graph 103 and graph 104, the horizontal axis represents the clock frequency of the CPUs 105 and the memory 106, respectively; and the vertical axis represents power consumption.

Graph 103 depicts according to the number of CPUs, the relation of clock frequency and power consumption of the CPUs 105. For example, a case is assumed where the number of CPUs contending for access is 2; and among the CPUs 105, the PMU 107 reduces the clock frequency of the CPUs contending for access, from a reference value of 1000 [MHz] to 500 [MHz]. Here, if the processing performance of the memory 106 bottle necks and the processing period does not change, even if the clock frequency is reduced, power consumption can be reduced without drops in the processing ability of the multicore processor system 100.

A case is assumed where the number of CPUs contending for access is 2; among the CPUs 105, the clock frequency of the CPUs that are contending for access is set to less than 500 [MHz]; and accompanying a reduction in the processing ability, the processing performance of the memory 106 becomes zero by bottle necking. For example, if the clock frequency of the CPUs contending for access is set to 250 [MHz], the processing period becomes longer that that for execution at a clock frequency of 1000 [MHz] and the processing ability of the multicore processor system 100 decreases.

Similarly, a case is assumed where the number of CPUs contending for access is 3; and among the CPUs 105, the PMU 107 reduces the clock frequency of the CPUs contending for access, from the reference value of 1000 [MHz] to 250 [MHz]. If the processing performance of the memory 106 bottle necks and the period for resolving the access contention does not change despite the clock frequency being reduced, power consumption can be reduced without drops in the performance of the multicore processor system 100.

Graph 104 depicts according to the number of CPUs, the relation between clock frequency and power consumption of the memory 106. Although increasing the clock frequency of the memory 106 increases the power consumption of the memory 106, on the other hand, the period for resolving the access contention becomes shorter and the operation period of the CPUs 105 and of the memory 106 with respect to access become shorter, and thus, there is also an element of reduced power consumption.

In the example depicted in graph 104, when the number of CPUs contending for access is 2 and the PMU 107 increases the clock frequency of the memory 106 from a reference value of 400 [MHz] to 600 [MHz], the power consumption becomes the lowest. Similarly, when the number of CPUs contending for access is 3 and the PMU 107 increases the clock frequency of the memory 106 to 800 [MHz], the power consumption becomes the lowest.

Based on these points, the power control method of the embodiments focuses on power consumption variations that accompany changes in clock frequency when access contention occurs and are based on the number of CPUs 105 contending for access. For example, in the case depicted by reference numeral 101 where 2 CPUs contend for access, the PMU 107 lowers the clock frequency of the CPU #0 and the CPU #1 among the CPUs 105 to 500 [MHz] and raises the clock frequency of the memory 106 to 600 [MHz] whereby, the power consumption of the multicore processor system 100 can be reduced the greatest in a case where the number of CPUs contending for access is 2.

Similarly, in the case depicted by reference numeral 102 where 3 CPUs contend for access, the PMU 107 lowers the clock frequency of the CPU #0 to the CPU #2 among the CPUs 10 to 250 [MHz] and raises the clock frequency of the memory 106 to 800 [MHz], whereby the power consumption of the multicore processor system 100 can be reduced the greatest in a case where the number of CPUs contending for access is 3.

Figure 2:
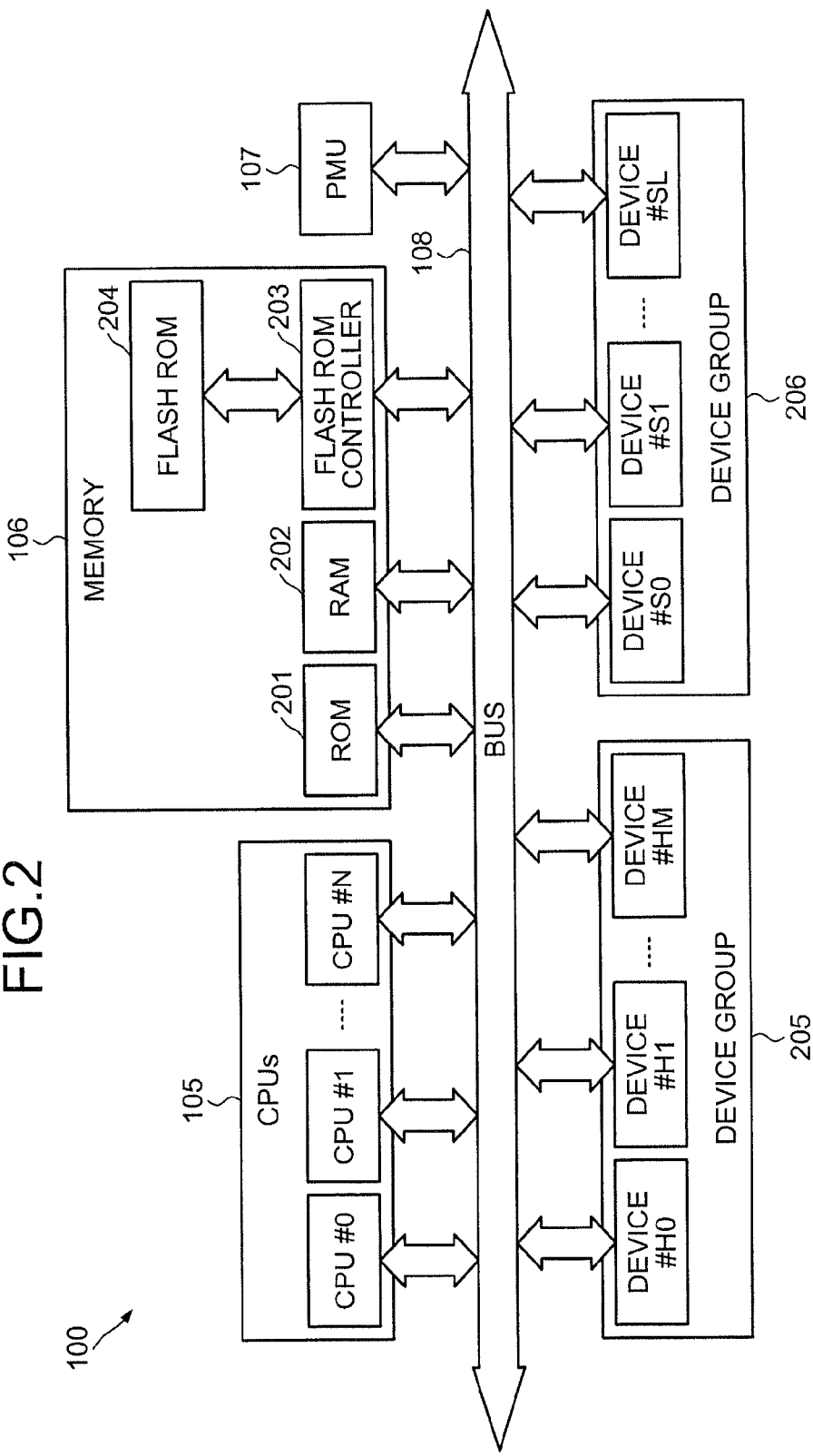
FIG. 2 is a block diagram of hardware of the multicore processor system 100.

FIG. 2 is a block diagram of hardware of the multicore processor system 100. The multicore processor system 100 includes the CPUs 105, the memory 106, the PMU 107, a device group 205, and a device group 206.

Here, the CPUs 105 govern overall control of the multicore processor system 100. Further, the "CPUs 105" refers to all of the CPUs, which are single core processors connected in parallel. The CPUs 105 include the CPU #0 to a CPU #N, where N is a whole number of 1 or greater. The CPU #0 to the CPU #N may respectively have a dedicated cache memory. Further, the multicore processor system is a computer system that includes a processor equipped with multiple cores. As long as multiple cores are provided, a single processor equipped with multiple cores may be provided or a group of single core processors in parallel may be provided. In the embodiments, description will be given taking, as an example, a configuration of parallel CPUs that are single core processors.

The memory 106 is a storage device accessible by the CPUs 105. For example, the memory 106 includes a read only memory (ROM) 201, a random access memory (RAM) 202, a flash ROM controller 203, and a flash ROM 204.

The ROM 201 stores programs such as a boot program. The RAM 202 is used as a work area of the CPUs 105. The flash ROM controller 203, under the control of the CPUs 105, controls the reading and writing of data with respect to the flash ROM 204. The flash ROM 204 is a recording medium that stores the data written under the control of the flash ROM controller 203. An example of the data includes image data, video data and the like acquired by the user of the multicore processor system 100, via the device group 205 and the device group 206; or a program that executes the power control method of the embodiments may be stored. Further, a memory card, an SD card and the like may be adopted as the flash ROM 204.

The device group 205 and the device group 206 are device groups accessible by the CPUs 105. The device group 205 and the device group 206, for example, may be a display, keyboard, etc. serving as an interface for the user. A thin film transistor (TFT) liquid crystal display may be adopted as a display, for example. Further, the device group 205 and the device group 206 may include, as a peripheral device that communicates with external devices, a communication device and the like.

The device group 205 is a group of devices that are arbitrated by hardware and includes a device #H0 to a device #HM, where M is a whole number of 0 or greater. Similarly, the device group 206 is a group of devices that are arbitrated by software and includes a device #S0 to a device #SL, where L is a whole number of 0 or greater. Among the CPUs 105, when 2 or more of the CPUs simultaneously access a device in the device group 205, access contention occurs. The number of CPUs that access the device in the device group 205 is defined as a contended access count Ch.

Similarly, among the CPUs 105, when 2 or more of the CPUs simultaneously request exclusive access of a device in the device group 206, arbitration by software is performed by the OS, etc. The number of CPUs requesting exclusive access of the device in the device group 206 is defined as an exclusive access count Cs.

The PMU 107 is an apparatus that manages the power source of the multicore processor system 100. For example, although not depicted in FIG. 2, the PMU 107 supplies a clock to the CPUs 105, the memory 106, the device group 205, and the device group 206 via clock lines, and supplies power source voltage via power lines. The PMU 107 corresponds to DVFS control; and the CPU #0, . . . , the CPU #N, the memory 106, the device #H0, . . . , the device #HM, the device #S0, . . . , the device #SL, and the bus 108 are separated into independent electrical domains. Further, the PMU 107 can vary the clock frequency and the voltage supplied to the CPUs 105, the memory 106, the device group 205, and the device group 206.

Figure 3:
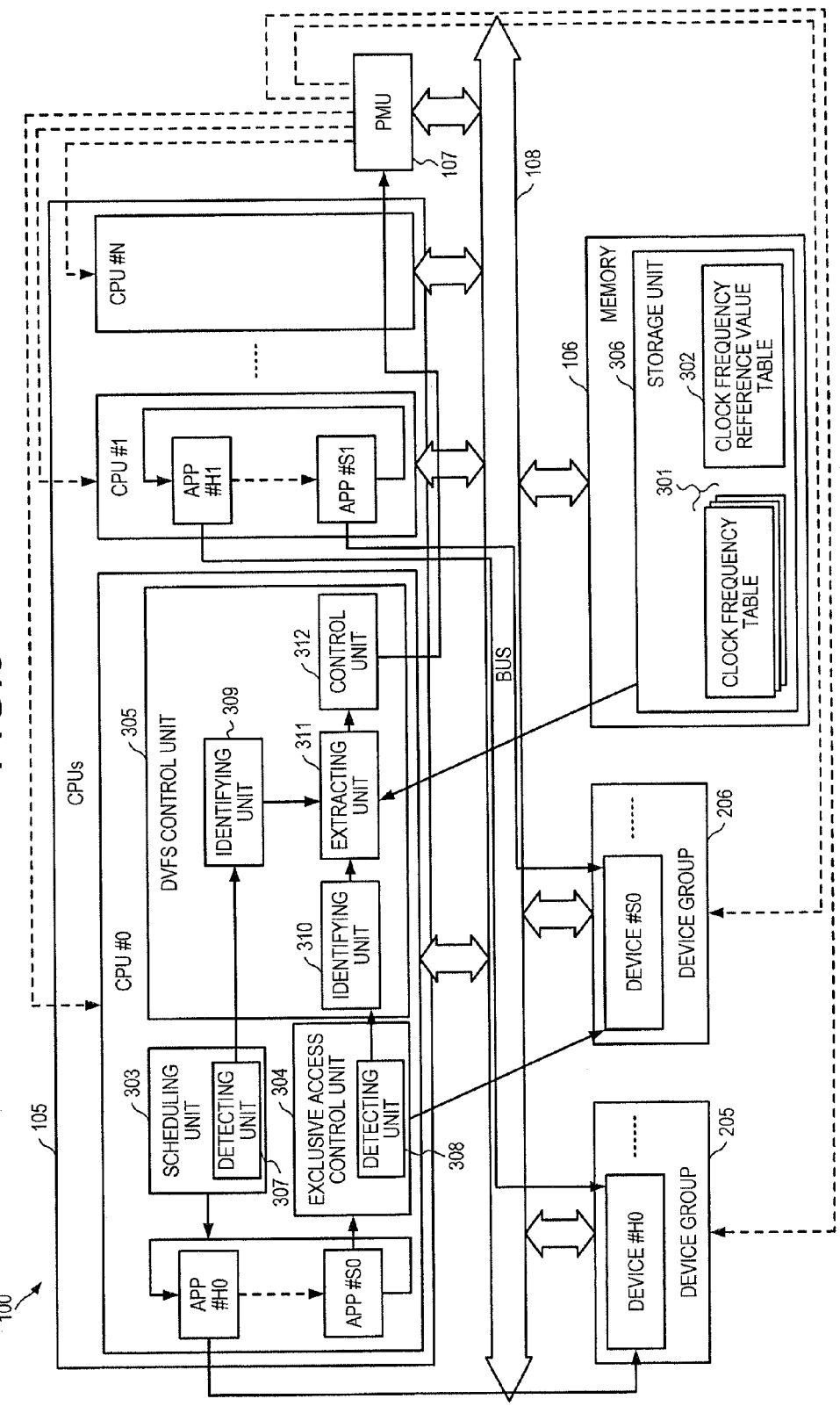
FIG. 3 is a block diagram of functions of the multicore processor system 100 in the first embodiment.

Although the memory 106 is depicted separately for the device group 205 and the device group 206 in FIG. 2, in the description concerning FIG. 3 and thereafter, the memory 106 may be a single device in the device group 205. The reason for this is that the memory 106 is arbitrated by hardware called a memory controller and therefore, the multicore processor system 100 can handle the memory 106 as the device group 205. Further, when exclusive access control by an OS function is performed for a portion of the address space in the memory 106, the multicore processor system 100 may handle the address space as 1 device in the device group 206.

FIG. 3 is a block diagram of functions of the multicore processor system 100 in the first embodiment. The multicore processor system 100 includes a scheduling unit 303, an exclusive access control unit 304, and a DVFS control unit 305. Functions of the scheduling unit 303 to the DVFS control unit 305 forming a control unit, are implemented by executing on any among the CPU #0 to the CPU #N, a program stored in a storage device. The storage device is, for example, the ROM 201, the RAM 202, and the flash ROM 204 included in the memory 106 depicted in FIG. 2.

The memory 106 includes a storage unit 306; the scheduling unit 303 includes a detecting unit 307; the exclusive access control unit 304 includes a detecting unit 308; the DVFS control unit 305 includes an identifying unit 309, an identifying unit 310, an extracting unit 311, and a control unit 312. In FIG. 3, although the scheduling unit 303, the exclusive access control unit 304, and the DVFS control unit 305 are depicted as functions of the CPU #0, the CPU #1 to the CPU #N may also include the same functions.

The storage unit 306 stores a clock frequency table 301 that indicates according to access count, which is the number of CPUs that access a device, a CPU clock frequency and a device clock frequency that minimize power consumption. A clock frequency table 301 is present for each of the devices #H0 to #HM and the devices #S0 to #SL; the clock frequency tables 301 are indicated as a clock frequency table 301#H0 to a clock frequency table 301#SL, respectively. The clock frequency tables 301 may further store the lowest voltage that enables stable operation at the stored CPU clock frequency. Additionally, the clock frequency tables 301 may store the lowest voltage that enables stable operation at the stored device clock frequency.

The storage unit 306 stores a clock frequency reference value table 302 that indicates reference values of the respective clock frequencies for the CPUs 105, the device group 205, and the device group 206. The clock frequency reference value table 302 may further indicate the lowest voltage that enables the clock frequency of the CPUs 105, the device group 205, and the device group 206 to be stable. The clock frequency table 301 and the clock frequency reference value table 302 are stored in the memory 106. Since the clock frequency table 301 and the clock frequency reference value table 302 are not subject to overwriting, the respective tables may be stored in the ROM 201. The clock frequency table 301 and the clock frequency reference value table 302 will be described in detail with reference to FIG. 11.

An app #H0 and an app #S0 are application software (hereinafter, "app") executed by the CPU #0; and an app #H1 and an app #S1 are apps executed by the CPU #1. The app #H0 and the app #H1 are assumed to be apps that frequently access the device #H0 in the device group 205; and the app #S0 is assumed to be an app that via the exclusive access control unit 304, accesses the device #S0 in the device group 206. The app #S1 is also assumed to be an app that via an exclusive access control unit in the CPU #1, accesses the device #S0.

The scheduling unit 303 has a function of allocating one executable app to the CPU #0. For example, the scheduling unit 303 allocates the app #H0 or the app #S0 to the CPU #0. Information of the allocated app is stored to a storage area of a register, a cache memory, or the RAM 202 of the CPU #0. Further, when allocating the app, the scheduling unit 303 detects a CPU group that causes access contention with respect to a given device in the device group 205.

The exclusive access control unit 304 has a function of providing exclusive access control with respect to a utilization request that is for the device group 206 and from an app. For example, the exclusive access control unit 304 grants utilization authorization in response to a utilization request that is for the device #S0 and from the app #S0. If another app has utilization authorization for the given device when a utilization request for the given device is received from the app #S0, the exclusive access control unit 304 causes the app #S0 to await authorization and requests the scheduling unit 303 to switch to another app that is executable. Further, when a utilization right is acquired or released, the exclusive access control unit 304 detects a CPU group that requests exclusive access to the given address in the device group 206.

The DVFS control unit 305 identifies an access contention state based on the detection by the scheduling unit 303 and by the exclusive access control unit 304, and extracts from the clock frequency table 301, a CPU clock frequency and a clock frequency of the given device to minimize power consumption. After the extraction, the DVFS control unit 305 controls the PMU 107 to cause the CPU that is accessing the given device to operate at the extracted CPU clock frequency. The DVFS control unit 305 further controls the PMU 107 to cause the given device to operate at the extracted device clock frequency.

The detecting unit 307 has a function of detecting a predetermined core group that causes access contention with respect to the given device in the device group 205. For example, the detecting unit 307 detects the CPU #0 allocated the app #H0 and the CPU #1 allocated the app #H1. Identification information of the detected CPUs, for example, is stored to a storage area of a register, a cache memory, or the RAM 202 of the CPU #0.

The detecting unit 308 detects a predetermined core group that requests exclusive access of the given device in the device group 206. For example, the detecting unit 307 detects the CPU #0 allocated the app #S0 that requests exclusive access of the device #S0 and the CPU #1 allocated the app #S1 that requests exclusive access of the device #S0. Identification information of the detected CPUs is stored to a storage area of a register, a cache memory, or the RAM 202 of the CPU #0.

The identifying unit 309 has a function of identifying an access contention state with respect to the given device in the device group 205. The identifying unit 309 identifies the contended access count Ch, which is the number of CPUs that access the given device. For example, the detecting unit 307 is assumed to have detected a state where the CPU #0 and the CPU #1 access the device #H0. In this case, the identifying unit 309 identifies the state to be an access contention state with respect to the device #H0, for which the contended access count Ch is 2. The contended access count is stored to a storage area of a register, a cache memory, or the RAM 202 of the CPU #0.

The identifying unit 310 has a function of identifying an exclusive access state with respect to the given device in the device group 206. The identifying unit 310 identifies the exclusive access count Cs, which is the number of CPUs that request exclusive access of the given device. For example, the detecting unit 308 is assumed to have detected a state where the CPU #0 and the CPU #1 request exclusive access of the device 4S0. In this case, the identifying unit 310 identifies the state to be an exclusive access state where the exclusive access count Cs is 2 for the device #S. The exclusive access count is stored to a storage area of a register, a cache memory, or the RAM 202 of the CPU #0.

The extracting unit 311 has a function of extracting from the clock frequency table 301 stored by the storage unit 306, the clock frequency of the given device and the clock frequency of the predetermined core group, according to the access contention state of the given device identified by the identifying unit 309.

For example, the identifying unit 309 is assumed to identify an access contention state of the device #H0 having a contended access count Ch=2. In this case, the extracting unit 311 extracts the record of the clock frequency table 301#H0, for which the contended access count Ch=2. As a result, the extracting unit 311 extracts the clock frequency of the device #H0 and the clock frequency of a predetermined CPU group included in the extracted record. For example, in the extracted record, 400 [MHz] is stored as the clock frequency of the device #H0 and 500 [MHz] is stored as the clock frequency of the CPU #0 and the CPU #1 that are the predetermined CPU group.

The extracting unit 311 has a further function of extracting from the clock frequency table 301 stored by the storage unit 306, the clock frequency of the given device, according to the exclusive access state of the given device identified by the identifying unit 310. For example, the identifying unit 310 is assumed to identify an exclusive access state of the device #S0 having an exclusive access count Cs=2. In this case, the extracting unit 311 extracts the record of the clock frequency table 301#S0, for which the exclusive access count Cs=2. As a result, the extracting unit 311 extracts the clock frequency of the device #S0 and the clock frequency of the predetermined CPU group included in the extracted record.

If the voltage corresponding to the clock frequency is stored in the clock frequency table 301, the extracting unit 311 may extract the voltage corresponding to the clock frequency of the device and the voltage corresponding to the clock frequency of the CPU group. The extracted device clock frequency and CPU clock frequency are stored to a storage area of a register, a cache memory, or the RAM 202 of the CPU #0.

The control unit 312 has a function of causing the given device to operate at the extracted clock frequency for the given device by the extracting unit 311 and of causing the predetermined core group to operate at the extracted clock frequency for the predetermined core group by the extracting unit 311. For example, the control unit 312 causes the device #H0 to operate at 400 [MHz], and causes the CPU #0 and the CPU #1 to operate at 500 [MHz].

As a clock frequency control method, for example, the control unit 312 notifies the PMU 107 of the electrical domain to which the given device or the CPU belongs and the value of the clock frequency. As a notification method, for example, the control unit 312 writes into a setting register of the PMU 107, identification information of electrical domain and the value of the clock frequency.

If the extracting unit 311 further extracts the voltage corresponding the extracted clock frequency, the control unit 312 may cause the given device or the predetermined core group to operate at the extracted clock frequency and voltage.

Thus, the multicore processor system 100 in the first embodiment detects among multiple cores, a predetermined core group that causes access contention at a device. Further, the multicore processor system 100 stores a device clock frequency and a core group clock frequency, for each state in which 2 or more cores contend for access of a device. The device clock frequency is a clock frequency that causes the processing speed of the device to be greater than or equal to the processing speed when no access contention occurs. The core group clock frequency is a clock frequency that causes the processing speed of the core group to be less than or equal to the processing speed of the core group when no access contention occurs, the core group being that which sustains access contention with respect to a device whose processing speed is greater than or equal to the processing speed thereof when no access contention occurs and corresponds to the number of cores sustaining the access contention.

The multicore processor system 100 identifies an access contention state at a device, by the detected predetermined core group. The multicore processor system 100 extracts from among stored device clock frequencies and core group clock frequencies, the clock frequencies of the device and of the predetermined core group corresponding to the identified access contention state at the device. The multicore processor system 100 causes the device to operate at the extracted clock frequency for the device and further causes the predetermined core group to operate at the extracted clock frequency for the predetermined core group.

Figure 4:
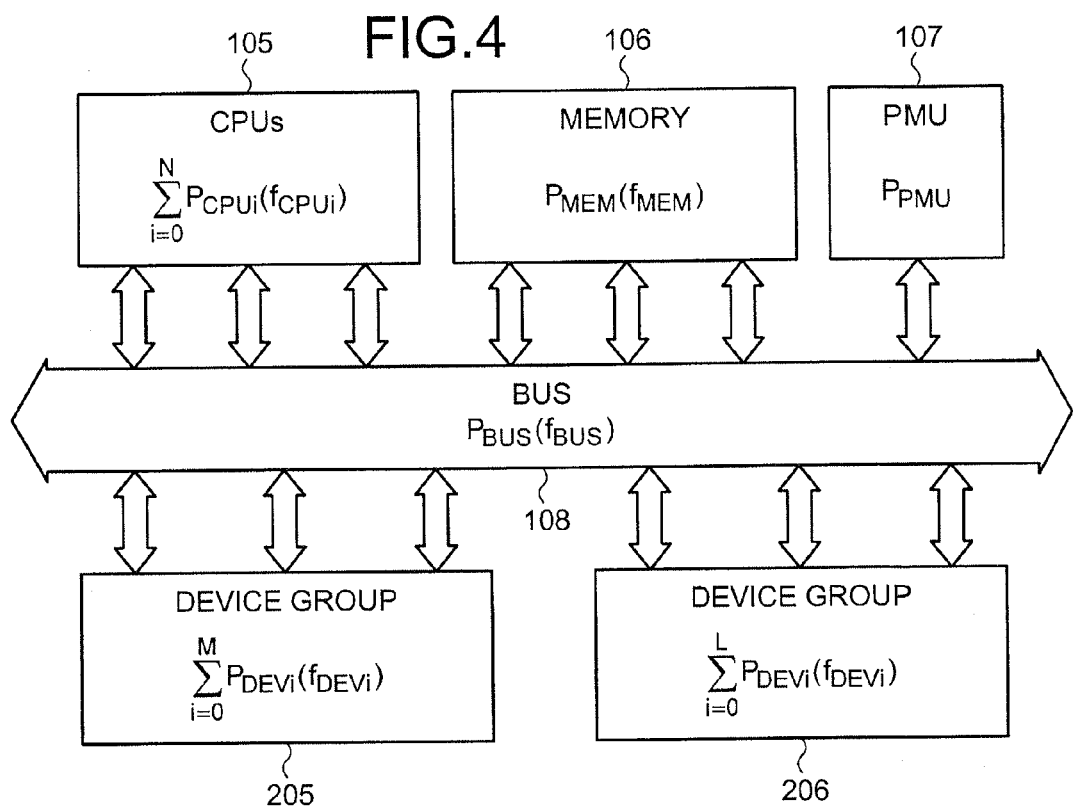
FIG. 4 is a diagram of a calculation example of power consumption by the multicore processor system 100.

FIG. 4 is a diagram of a calculation example of power consumption by the multicore processor system 100. The power consumption of the multicore processor system 100 overall can be calculated by equation (1).

$$P = \sum_{i=0}^{N} P_{CPUi}(f_{CPUi}) + P_{MEM}(f_{MEM}) + P_{BUS}(f_{BUS}) + \sum_{i=0}^{M} P_{DEVi}(f_{DEVi}) + \sum_{i=0}^{L} P_{DEVi}(f_{DEVi}) + P_{PMU} \quad (1)$$

Where, P is the power consumption of the multicore processor system 100 overall; N is the largest CPU number among the CPUs 105; M is the largest device number in the device group 205 that performs arbitration by hardware; L is the largest device number in the device group 206 that performs arbitration by software; $P_{xxx}(f_{xxx})$ is the power consumption of each electrical domain when the clock frequency is $f_{xxx}$. Where "xxx" is: CPUi, which indicates the i-th CPU among the CPUs 105; MEM, which indicates the memory 106; BUS, which indicates the bus 108; DEVi, which indicates the i-th device in the device group 205 or in the device group 206; and PMU, which indicates the PMU 107.

Since the clock frequency of the electrical domains can be set independently by DVFS control, with the exception of that of the PMU 107, the total power consumption for the clock frequency set for each of the electrical domains is the power consumption of the multicore processor system 100 overall. Concerning the voltages, since a setting of the lowest voltage that enables stable operation at the set clock frequency suffices, when the clock frequency is determined, the voltage is also uniquely determined. The multicore processor system 100 in the embodiments reduces the clock frequency of the CPUs contending for access among the CPUs 105, or increases the contention clock frequency of the memory 106, the device group 205, or the device group 206. Operations of arbitration by hardware and by software will be described in detail with reference to FIGS. 5 to 9.

Figure 5:
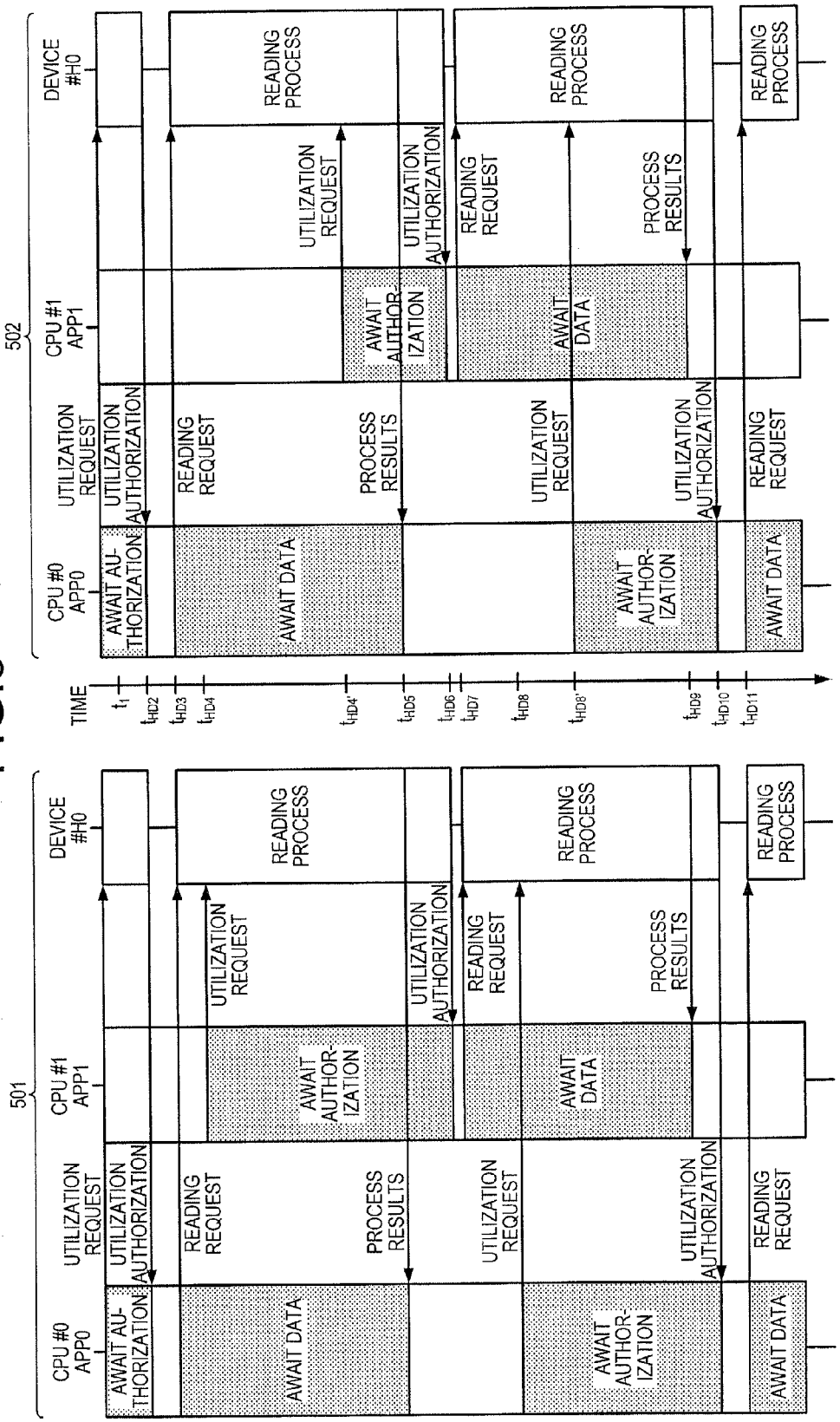
FIG. 5 is a diagram depicting an operation sequence for a device #S0 subject to arbitration by hardware.

FIG. 5 is a diagram depicting an operation sequence for the device #S0 subject to arbitration by hardware. In FIG. 5, the CPU #0 and the CPU #1 are assumed to use the device #H0 simultaneously. Reference numeral 501 depicts operation where the clock frequencies of the CPU #0 and of the CPU #1 are not changed; and reference numeral 502 depicts operation where the clock frequencies of the CPU #0 and of the CPU #1 are reduced. Further, information indicating that the apps executed by the CPU #0 and the CPU #1 frequently access the device #H0 is stored in the memory 106. The app executed by the CPU #0 is assumed to be an app 0 and the app executed by the CPU #1 is assumed to be the app 1.

Here, an app that frequently accesses the device #H0 is an app that per unit time, accesses the device #H0 a number of times that is greater than or equal to a predetermined threshold. For example, the predetermined threshold is set to be 1000 times or more per 1 second. For example, the multicore processor system 100 may set, as an app that frequently accesses an audio device that reproduces sound, an audio app that plays music and is in a process, which plays and edits audio files. A browser app that browses audio files also uses the audio device when an operation sound corresponding to a user operation is output. However, the operation sound is played for a short time and the access count per unit time does not exceed the threshold and therefore, the multicore processor system 100 does not set the app as one that frequently accesses the audio device.

The operation indicated by reference numeral 501 will be described. At a time $t_1$, the CPU #0 and the CPU #1 begin execution of the app 0 and the app 1, respectively. At the time $t_1$, the CPU #0 sends a utilization request to the device #H0 at the request of the app 0. Since the device #H0 is not being used by another CPU, at time $t_{HD2}$, the device #H0 sends utilization authorization to the CPU #0. Meanwhile, the CPU #0 has entered an authorization waiting state and is suspended from the time $t_1$ until the time $t_{HD2}$ while awaiting receipt of utilization authorization.

The CPU #0 having received utilization authorization, sends at a time $t_{HD3}$ after hardware has executed a process, a reading request to read data of the device #H0. A hardware process is a process of the hardware other than an instruction set read from the memory 106 of the CPU. A process of the hardware other than an instruction set is, for example, a process of the memory controller that arbitrates contention at the memory 106, or a process of a cache coherency mechanism that establishes coherency among the cache memories of the CPUs 105.

The device #H0 having received the reading request, executes a reading process and at a time $t_{HD5}$, sends the process results to the CPU #0. Meanwhile, the CPU #0 has entered a data waiting state and is suspended from the time $t_{HD3}$ until the time $t_{HD5}$ while awaiting receipt of the process results.

In the meantime, the CPU #1 sends a utilization request to the device #H0 at a time $t_{HD4}$. At a time $t_{HD6}$ when the reading process finishes, the device #H0 sends utilization authorization to the CPU #1. Meanwhile, the CPU #1 has entered an authorization waiting state and is suspended from the time $t_{HD4}$ until the time $t_{HD6}$ while awaiting receipt of utilization authorization.

The CPU #1 having received utilization authorization, sends a reading request to read data of the device #H0 at a time $t_{HD7}$. The device #H0 having received the reading request, executes a reading process and at a time $t_{HD9}$, sends process results to the CPU #1. In the meantime, the CPU #0 sends a utilization request to the device #H0 at a time $t_{HD8}$. In this case, at a time $t_{HD10}$ after the reading process finishes, the device #H0 sends utilization authorization to the CPU #0. The CPU #0 having received utilization authorization, sends a reading request to the device #H0 at a time $t_{HD11}$.

The communication of data among the CPUs 105, the device group 205, and the device group 206 is performed using an electrical signal of the bus 108. When one of the CPUs among the CPUs 105 sends a request to the device group 205, the operation of the CPU is suspended until a signal in response to the request is received from the device group 205. In FIG. 5, the CPU #0 executes the app 0 from the time $t_{HD5}$ until the time $t_{HD8}$.

The operation indicated by reference numeral 502 will be described. At the time $t_1$, the CPU #0 and the CPU #1 begin execution of the app 0 and the app 1, respectively. When executing an app, the multicore processor system 100 reduces the clock frequency of CPUs that executes apps that frequently access the same device. For example, the multicore processor system 100 reduces the clock frequency of the CPU #0 and the CPU #1.

During the time $t_1$ to the time $t_{HD3}$ indicated by reference numeral 502, the CPU #0 requests processing of the device #H0, which does not affect the CPU clock frequency for the memory controller or the cache coherency mechanism and therefore, there is no change from the processing period depicted by reference numeral 501. However, concerning the operation of the CPU #1, the clock frequency of the CPU #1 is reduced and therefore, the process of the app 1 occurs later and the time at which the utilization request is sent to the device #H0 is at a time $t_{HD4}$' that is after the time $t_{HD4}$ depicted by reference numeral 501.

As depicted in FIG. 5, when multiple CPUs frequently access 1 device, the wait for a response from the device causes a bottle neck and therefore, a shortening of the period of the authorization waiting state does not reduce the processing performance of the multicore processor system 100. In the example depicted by reference numeral 502, after the utilization request is sent at the time $t_{HD4}$', the time when the CPU #1 receives utilization authorization is the time $t_{HD6}$, which is after the reading process ends for the CPU #0 at the time $t_{HD5}$ and is the same timing depicted by reference numeral 501. Therefore, the processing performance of the multicore processor system 100 does not change.

The CPU #0 continues executing the app 0 from the time $t_{HD5}$. The clock frequency of the CPU #0 is lower than the clock frequency used for operation in the example depicted by reference numeral 501 and consequently, the process of the app 0 occurs later and the time when the utilization request is sent to the device #H0 is at the time $t_{HD8}$', which is after the time $t_{HD8}$ depicted by reference numeral 501. Even if the time of the utilization request is later, the time at which utilization authorization is received from the device #H0 is still the time $t_{HD10}$ and is the same timing as that depicted by reference numeral 501 and therefore, the processing performance of the multicore processor system 100 does not change.

Thus, the multicore processor system 100 can reduce to a predetermined clock frequency, the clock frequency of the CPUs that maintain the overall process performance of the multicore processor system 100 and use a device that performs hardware arbitration. The predetermined clock frequency is, for example, the clock frequency that causes the time $t_{HD4}$' at which the utilization request of the app 1 is sent by the CPU #1 in the example depicted by reference numeral 502 to coincide with the time $t_{HD5}$.

If the clock frequency is reduced below the predetermined clock frequency, the time at which the device #H0 sends utilization authorization to the CPU #1 becomes later than the time $t_{HD6}$ and consequently, the processing performance of the multicore processor system 100 decreases. Therefore, a state where the clock frequency of the CPUs contending for access is set at the predetermined clock frequency is a state that can reduce power consumption without drops in the processing performance of the multicore processor system 100.

The range of the clock frequency that does not reduce the processing performance of the multicore processor system 10 is determined by causing the device group 205 to be simultaneously used by the CPUs 105, changing the clock frequency and the number of CPUs simultaneously performing access, and judging whether the processing performance decreases. If the processing performance does not decrease, the multicore processor system 100 the number of CPUs simultaneously performing access and the clock frequency are stored to a frequency table.

Figure 6:
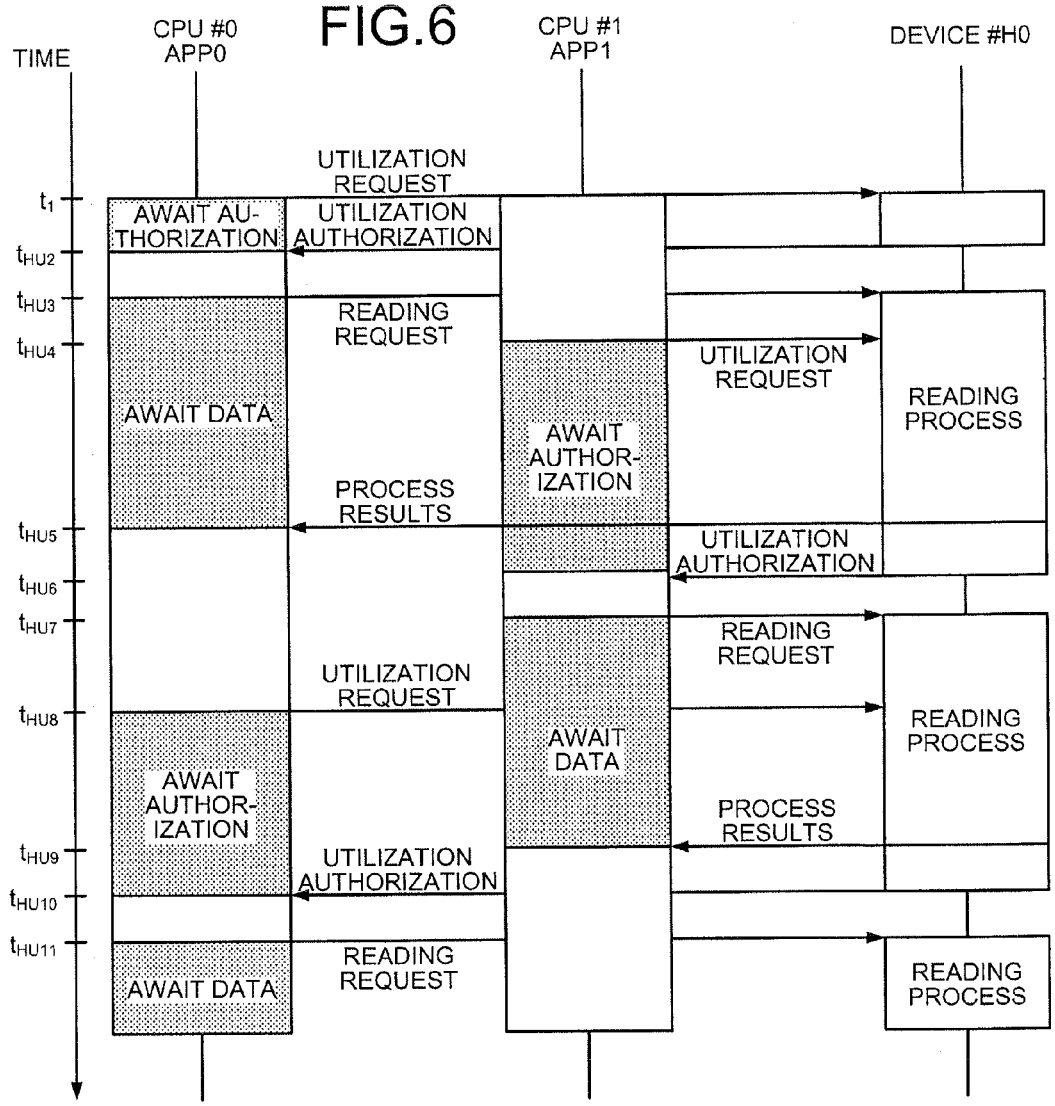
FIG. 6 is a diagram depicting an operation sequence for s device #H0 subject to arbitration by hardware and whose clock frequency has been increased.

FIG. 6 is a diagram depicting an operation sequence for the device #H0 subject to arbitration by hardware and whose clock frequency has been increased. FIG. 6 depicts a state where the clock frequency of the device #H0 has been increased from the state depicted by reference numeral 501 and consequently, the processing speed has been increased. Further, in FIG. 6, the time at which execution of the app 0 and the app 1 begins is the time $t_1$, the same time as that depicted in FIG. 5.

The arbitration sequence for a case where the clock frequency of the device #H0 has been increased is equivalent to the arbitration sequence depicted by reference numeral 501, excluding the times at which each operation is executed. For example, by substituting a time $t_{HU2}$ to a time $t_{HU11}$ depicted in FIG. 6 with the time $t_{HD2}$ to the time $t_{HD11}$, the sequence depicted in FIG. 6 and the sequence depicted by reference numeral 501 are equivalent, excluding the times at which the operations are executed. Therefore, the operations of the CPU #0, the CPU #1, and the device #H0 at the times depicted in FIG. 6 are equivalent to the operations at the corresponding times depicted by reference numeral 501 and thus, further description is omitted. In the description hereinafter, points where the time at which operations are executed change consequent to an increase in the processing speed of the device #H0 will be described.

The processing speed of the device #H0 increases consequent to an increase of the clock frequency. In the example depicted in FIG. 6, when the CPU #0 sends a reading request at the time $t_{HU3}$, the device #H0 finishes the reading process and sends the process results at the time $t_{HU5}$, which is sooner than the time $t_{HD5}$ depicted in FIG. 5. The device #H0 sends utilization authorization to the CPU #1 at the time $t_{HU6}$, which is sooner than the time $t_{HU6}$.

The CPU #1 sends a reading request to the device #H0 at the time $t_{HU7}$. The device #H0 having received the reading request, executes a reading process and at the time $t_{HU9}$, sends process results to the CPU #1. Since the clock frequency of the device #H0 has been increased, the device #H0 completes the reading process from the time $t_{HU7}$ to the time $t_{HU9}$, which is a shorter period that the time $t_{HD7}$ to the time $t_{HD9}$.

The CPU #0 sends a utilization request to the device #H0 at the time $t_{HU8}$. The device #H0 having received the utilization request sends utilization authorization to the CPU #0 at the time $t_{HU10}$ after the reading process finishes. The CPU #0 having received utilization authorization, sends a reading request to the device #H0 at the time $t_{HU11}$. In this case, for the CPU #0, an authorization waiting period from the time $t_{HU8}$ to the time $t_{HU10}$ is shorter than the authorization waiting period from the time $t_{HD8}$ to the time $t_{HD10}$ depicted by reference numeral 501.

Thus, although the power consumption of the device #H0 increases consequent to increasing the clock frequency of the device #H0, the overall processing period of the multicore processor system 100 becomes shorter and therefore, the power consumption of the multicore processor system 100 can be reduced. A calculation example of the power consumption will be described with reference to FIG. 9.

Figure 7:
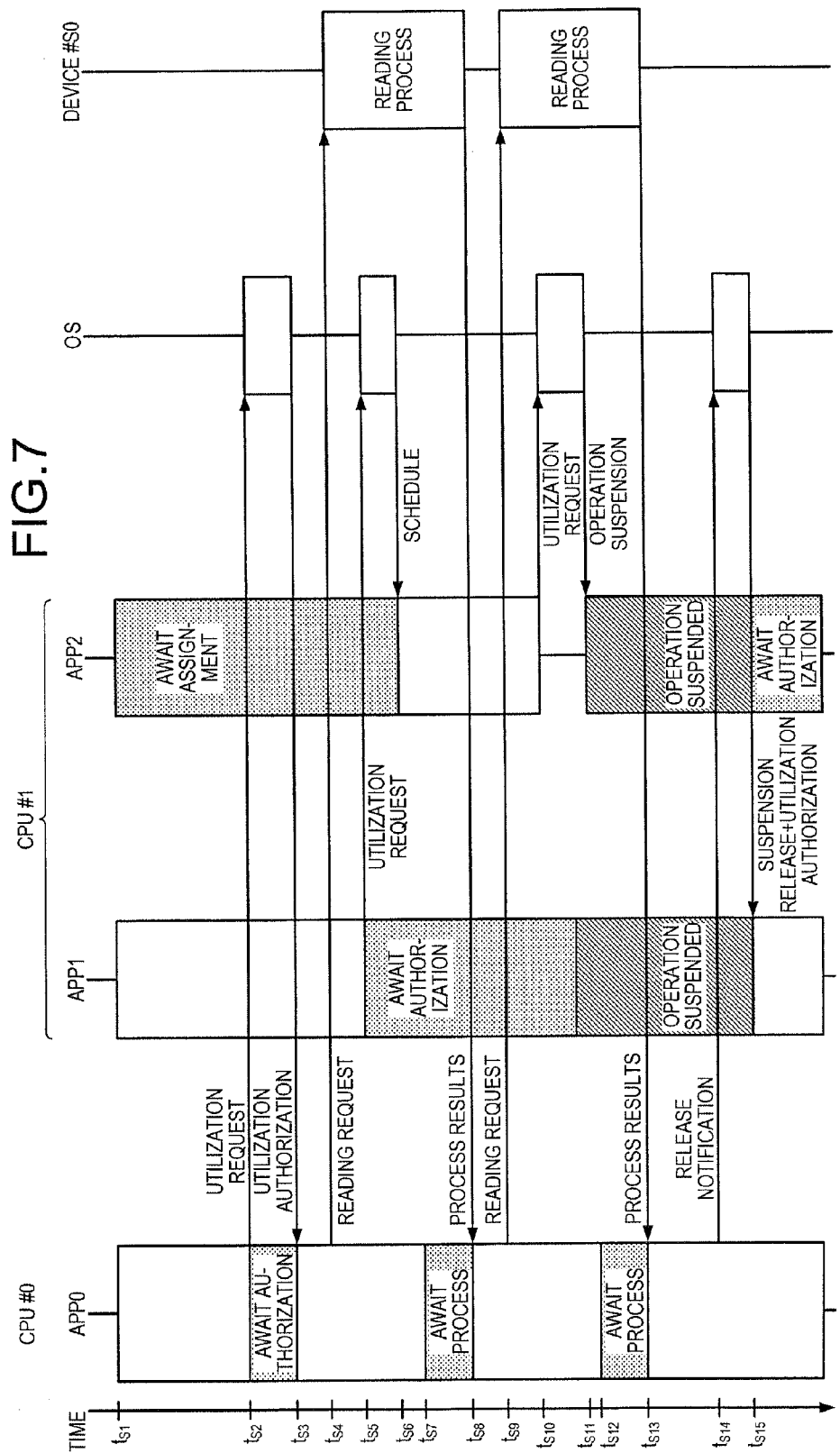
FIG. 7 is a diagram depicting an operation sequence of a device #S0 subject to arbitration by software.

FIG. 7 is a diagram depicting an operation sequence of the device #S0 subject to arbitration by software. In FIG. 7, the CPU #0 is assumed to execute the app 0; the CPU #1 is assumed to execute the app 1 and an app 2 by time division; and the app 0 to the app 2 are assumed to be apps that use the device #S0. Further, when the CPUs 105 access the device #S0, arbitration is assumed to be performed using a library that realizes OS exclusive access. A mutex, semaphore, etc. exist as a library realizing exclusive access.

Various forms of implementation exist for OS operation. For example, an OS executed by 1 CPU may manage all other CPUs. Further, among OSs executed by the CPUs 105, a predetermined OS may manage OSs executed by another CPU. Even with such implementations, among the apps executed by the multicore processor system 100, 1 app is permitted exclusive access to a device and therefore, in FIG. 7, the OSs are depicted as one OS.

At a time $t_{S1}$, the CPU #0 executes the app 0 and the CPU #1 is executing the app 1. The app 2 is in a state of awaiting allocation. At a time $t_{S2}$, the app 0 sends to the OS, a utilization request for the device #S0. The OS having received the utilization request, determines at the time $t_{S2}$, that the device #S0 is not being used by another app and at a time $t_{S3}$, sends utilization authorization to the app 0.

If arbitration by software is being performed, unlike a case where arbitration by hardware is performed, the app having received utilization authorization, can use the device multiple times. Further, the app having received utilization authorization can continue a process thereof even after sending a process request to the device. If the app that has received utilization authorization wants to use process results of the device, but has not received the process results, the app waits until the process results are received. The app notifies the OS of release of utilization authorization and declares use of the device to be completed after the app has finished using the device.

The app 0 having received utilization authorization at the time $t_{S3}$, sends to the device #S0 at a time $t_{S4}$, a reading request, which is one type of process request, and continues executing the process of the app 0. At a time $t_{S7}$, the app 0 begins waiting for reading process results used in the process of the app 0 and thus, enters a process waiting state.

Meanwhile, at a time $t_{S5}$, the app 1 sends a utilization request to OS. The OS having received the utilization request from the app 1, determines that at the time $t_{S5}$, another app is using the device #S0 and causes the app 1 to enter an authorization waiting state. At a time $t_{S6}$, the OS performs a scheduling process to determine an app to be executed in place of the app 1 that has entered the authorization waiting state. As a result of performing the scheduling process, the OS causes the CPU #1 to execute the app 2.

The device #S0 having received the reading request at the time $t_{S4}$ sends the process results at a time $t_{S8}$. The app 0 having received the process results, again sends a reading request to the device #S0 at a time $t_{S9}$ and enters the process waiting state at a time $t_{S12}$.

At a time $t_{S10}$, the app 2 sends a utilization request to OS. The OS having received the utilization request from the app 2, determines that at the time $t_{S10}$, another app is using the device #S0. At a time $t_{S11}$, the OS performs a scheduling process to determine an app to execute in place of the app 2. As a result of the scheduling process, the OS determines that there is no app executable by the CPU #1 and suspends the operation of the CPU #1.

The device #S0 having received the reading request at the time $t_{S9}$, sends the process results at a time $t_{S10}$. After receiving the process results, the app 0 sends to the OS at a time $t_{S14}$, notification of the release of the utilization authorization for the device #S0. The OS having received the notification of utilization authorization release, sends at a time $t_{S15}$, notification of the release of operation suspension and utilization authorization for the device #S0 to the app 1, which was the first app to begin waiting for authorization among the apps awaiting authorization. The app 1 having received the suspension release and utilization authorization for the device #S0 continues executing the process of the app 1; and the app 2 enters the authorization waiting state.

Figure 8:
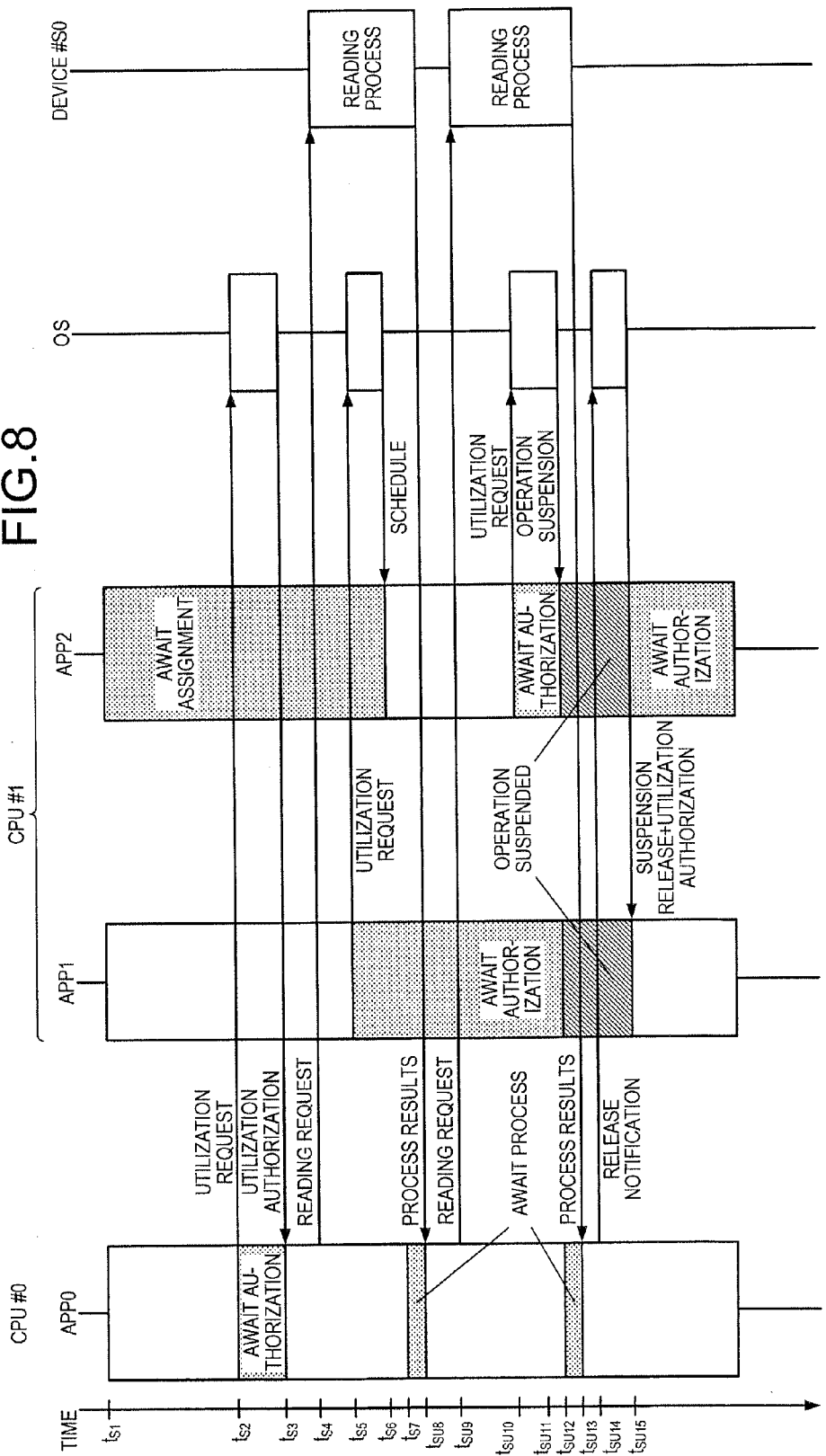
FIG. 8 is a diagram depicting an operation sequence for the device #S0 subject to arbitration by software and whose clock frequency has been increased.

FIG. 8 is a diagram depicting an operation sequence for the device #S0 subject to arbitration by software and whose clock frequency has been increased. FIG. 8 depicts a state where the clock frequency of the device #S0 has been increased from the state depicted in FIG. 7 and consequently, the processing speed has been increased. Further, in FIG. 8, the time at which execution of the app 0 to the app 2 begins is the time $t_{S1}$, the same time as that depicted in FIG. 7.

The arbitration sequence for a case where the clock frequency of the device #S0 has been increased is equivalent to the arbitration sequence depicted in FIG. 7, excluding the times at which each operation is executed. For example, by substituting a time $t_{SU8}$ to a time $t_{SU15}$ depicted in FIG. 8 with the time $t_{S8}$ to the time $t_{S15}$, the sequence depicted in FIG. 8 and the sequence depicted in FIG. 7 are equivalent, excluding the times at which the operations are executed. Therefore, the operations of the app 0 to the app 2, the OS, and the device #H0 depicted in FIG. 8 are equivalent to the operations act the corresponding times depicted in FIG. 7 and thus, further description is omitted. In the description hereinafter, points where the time at which operations are executed change consequent to an increase in the processing speed of the device #S0 will be described.

With a utilization request at the time $t_{S2}$, the processing speed of the device #S0 increases consequent to an increase of the clock frequency. In the example depicted in FIG. 8, when the app 0 sends a reading request at the time $t_{S4}$, the device #S0 finishes the reading process and sends the process results to the app 0 at a time $t_{SU8}$, which is sooner than the time $t_{S8}$ depicted in FIG. 7. Consequently, a process waiting period of the app 0 from the time $t_{S7}$ to the time $t_{SU8}$ is shorter than the period of the process waiting state from the time $t_{S7}$ to the time $t_{S8}$ depicted in FIG. 7.

Similarly, when the app 0 again sends a reading request at a time $t_{SU9}$, the device #S0 finishes the reading process at a time $t_{SU13}$ and sends the process results to the app 0. Consequently, the process waiting period of the app 0 from a time $t_{SU12}$ to the time $t_{SU13}$ is shorter than the period of the process waiting state the time $t_{S12}$ to the time $t_{S13}$ depicted in FIG. 7. Further, the period of the authorization waiting state and operation suspension of the app 1 from the time $t_{S5}$ to a time $t_{SU15}$ is shorter than the period of the authorization waiting state and operation suspension from the time $t_{S5}$ to the time $t_{S15}$ depicted in FIG. 7.

Thus, although the power consumption of the device #S0 increases consequent to increasing the clock frequency of the device #S0, the overall processing period of the multicore processor system 100 becomes shorter and therefore, the power consumption of the multicore processor system 100 can be reduced. A calculation example of the power consumption will be described with reference to FIG. 10.

Figure 9:
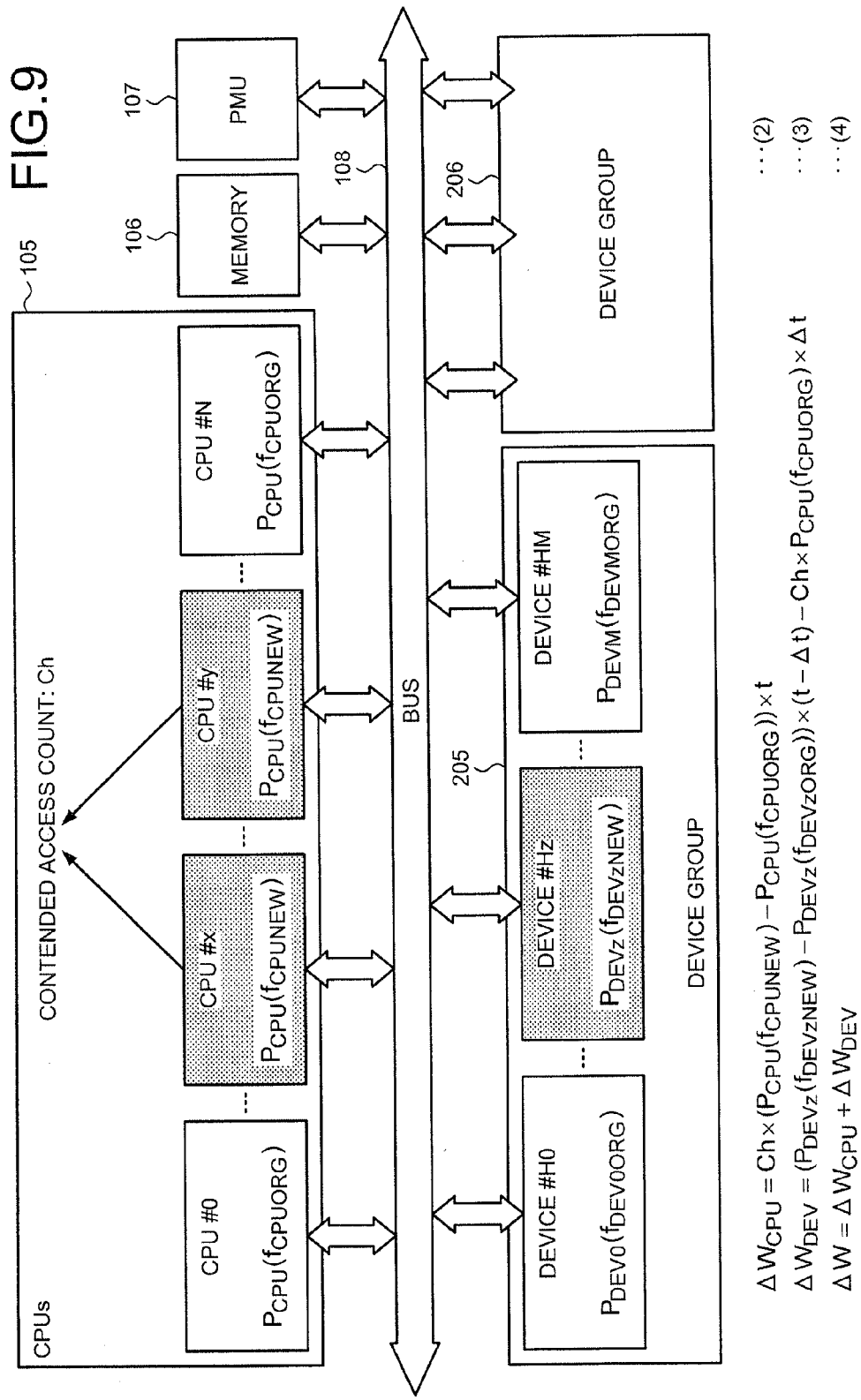
FIG. 9 is a diagram depicting power consumption accompanying changes in the clock frequency of a device group 205 subject to arbitration by hardware.

FIG. 9 is a diagram depicting power consumption accompanying changes in the clock frequency of the device group 205 subject to arbitration by hardware. In FIG. 9, the CPUs including CPU #x to CPU #y of a number equal to Ch are assumed to be executing apps that frequently access a device #Hz. A difference $\Delta W_{CPU}$ of the power consumption when the clock frequency of the CPUs 105 is lower can be calculated by equation (2).

$$\Delta W_{CPU} = Ch \times (P_{CPU}(f_{CPUNEW}) - P_{CPU}(f_{CPUORG})) \times t \quad (2)$$

Where, $f_{CPUNEW}$ is the post-change clock frequency of the CPU #x to the CPU #y; $f_{CPUORG}$ is the pre-change clock frequency of the CPU #x to the CPU #y; and t is the time that contention occurs. A difference $\Delta W_{DEV}$ of the power consumption when the clock frequency of the device #Hz is increased can be calculated by (3).

$$\Delta W_{DEV} = (P_{DEVz}(f_{DEVzNEW}) - P_{DEVz}(f_{DEVzORG})) \times (t - \Delta t) - Ch \times P_{CPU}(f_{CPUORG}) \times \Delta t \quad (3)$$

Where, $f_{DEVzNEW}$ is the post-change clock frequency of the device #Hz; $f_{DEVzORG}$ is the pre-change clock frequency of the device #Hz; and $\Delta t$ is the shortened processing period consequent to increasing the processing speed. The first term of equation (3) represents the increase in power consumption by the device #Hz; the second term represents the decrease in power consumption consequent to shortening the processing period. By using equations (2) and (3), a difference $\Delta W$ of the overall power consumption of the multicore processor system accompanying the changes in the clock frequency of the device #Hz can be calculated by equation (4).

$$\Delta W = \Delta W_{CPU} + \Delta W_{DEV} \quad (4)$$

Using equations (2) to (4), a clock frequency of the CPU #x to the CPU #y and a clock frequency of the device #Hz are calculated that minimize the power consumption W for the contended access count Ch at the design stage of an apparatus under development. The calculation results are stored to a clock frequency table 301#Hz. In the equations (2) to (4), t is constant and $\Delta t$ is proportional to the rate of change of the clock frequency $((f_{DEVzNEW} - f_{DEVzORG})/f_{DEVzORG})$ and t. Therefore, equations (2) to (4) can be calculated using the correspondence of the frequency and power first measured, the frequencies of the CPU and device, and the number of CPUs using the device group 205 as parameters.

Figure 10:
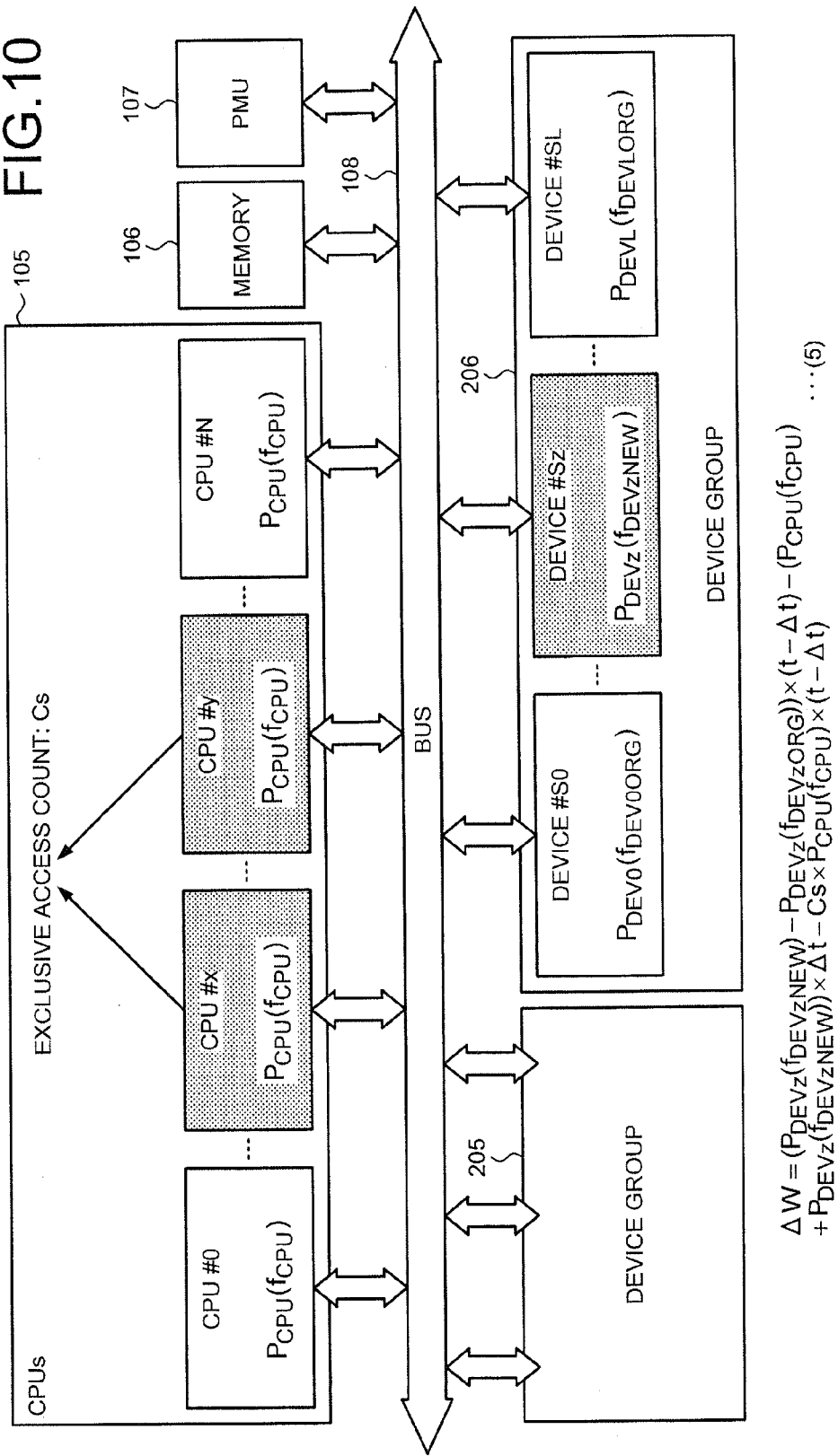
FIG. 10 is a diagram depicting power consumption accompanying changes in the clock frequency of a device group 206 subject to arbitration by software.

FIG. 10 is a diagram depicting power consumption accompanying changes in the clock frequency of the device group 206 subject to arbitration by software. In FIG. 10, CPUs including the CPU #x to CPU #y of a number equal to Cs are assumed to be executing apps that use a device #Sz and request exclusive access of the device #Sz. A difference $\Delta W$ in the overall power consumption of the multicore processor system 100 accompanying changes in the clock frequency of the device #Sz can be calculated by equation (5).

$$\Delta W = (P_{DEVz}(f_{DEVzNEW}) - P_{DEVz}(f_{DEVzORG})) \times (t - \Delta t) - (P_{CPU}(f_{CPU}) + P_{DEVz}(f_{DEVzNEW})) \times \Delta t - Cs \times P_{CPU}(f_{CPU}) \times (t - \Delta t) \quad (5)$$

Where, the first term of equation (5) represents the increase in power consumption consequent to increasing the clock frequency of the device #Sz; the second term represents the decrease in power consumption of the device #Sz consequent to shortening the processing period and the decrease in power consumption of the CPUs that use the device #Sz among the CPUs 105; the third term represents the decrease in power consumption consequent to suspending the operation of the CPUs of the exclusive access count Cs and not having a process to be performed among the CPUs 105.

Using equation (5), a clock frequency of the CPU #x to the CPU #y and a clock frequency of the device #Sz are calculated that minimize the power consumption W for the exclusive access count Cs at the design stage of an apparatus under development. The calculation results are stored to a clock frequency table 301#Sz.

Figure 11:
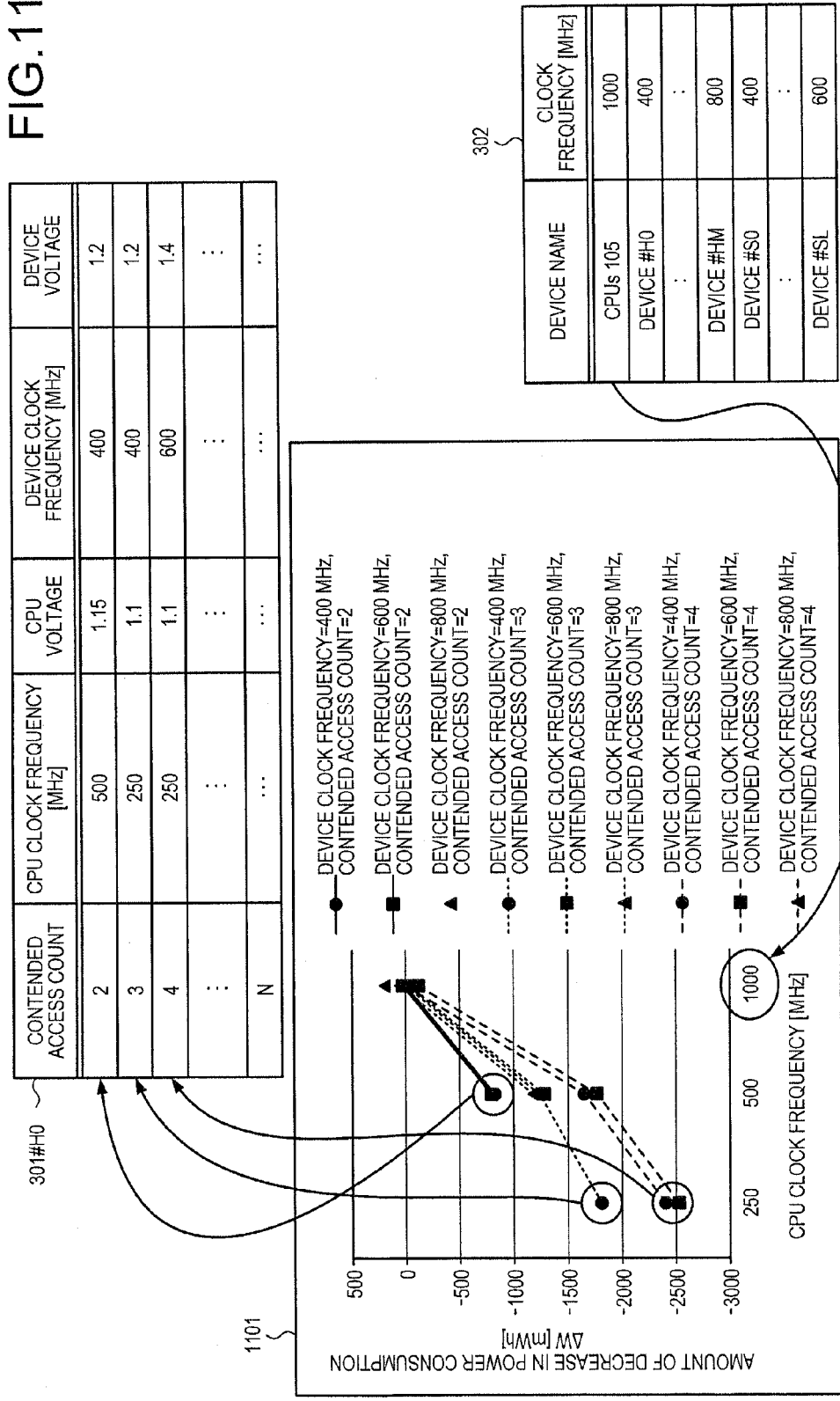
FIG. 11 is a diagram depicting an example of changes in power consumption and the contents of a clock frequency table 301 in the first embodiment.

FIG. 11 is a diagram depicting an example of changes in power consumption and the contents of the clock frequency table 301 in the first embodiment. FIG. 11 depicts a graph 1101 of changes in power consumption when access contention occurs at the device #H0, the clock frequency table 301#H0 generated based on the values in graph 1101, and the clock frequency reference value table 302.

Graph 1101 depicts changes in the overall power consumption of the multicore processor system 100 when access contention occurs at the device #H0; the horizontal axis represents the clock frequency of the CPUs contending for access; and the vertical axis represents the increase in power consumption. The clock frequencies to which the PMU 107 can change the clock frequency of the CPUs 105 are assumed to be 1000 [MHz], which is the reference value, 500 [MHz], and 250 [MHz]. The values to which the clock frequency of the device #H0 can be changed are assumed to be 400 [MHz], which is the reference value, 600 [MHz], and 800 [MHz].

The clock frequency table 301#H0 includes 5 fields respectively for the contended access count, the CPU clock frequency, the CPU voltage, the device clock frequency, and the device voltage. The contended access count field stores the number of CPUs that contend for access of the device #H0, among the CPUs 105. The CPU clock frequency field stores the setting value of the CPU clock frequency to maximally reduce the overall power consumption of the multicore processor system 100 according to the contended access count. The CPU voltage field stores the lowest voltage that enables stable operation at the CPU clock frequency stored in the CPU clock frequency field.

The device clock frequency field stores the setting value of the clock frequency of the device #H0 to maximally reduce the overall power consumption of the multicore processor system 100 corresponding to the contended access count. The device voltage field stores the lowest voltage that enables stable operations at the device clock frequency stored in the device clock frequency field. For example, if the CPU clock frequency field stores 500 [MHz] and the CPU voltage field stores 1.15 [V], the PMU 107 sets the clock frequency of the CPUs contending for access to 500 [MHz] and the voltage thereof to 1.15 [V].

The clock frequency reference value table 302 includes 2 fields respectively for the device name and the clock frequency. The device name field stores the name of the CPUs 105, the devices #H0 to #HM, and the devices #S0 to #SL or an identification (ID) that is a value uniquely identifying a device. The clock frequency field stores a reference value of the clock frequency of the CPUs 105, the device group 205, or the device group 206 stored in the device name field.

For example, 1000 [MHz] is stored as the reference value of the clock frequency of the CPUs 105. The clock frequency reference value table 302 may also include a field indicating the lowest voltage enabling stable operation at the stored reference value of the clock frequency.

For example, when the contended access count is 2, if the CPU clock frequency is 500 [MHz] and the clock frequency of the device #H0 is 400 [MHz], the reduction in power consumption is greatest. Therefore, in the record of the clock frequency table 301#H0 for a contended access count of 2, CPU clock frequency=500 [MHz] and the device clock frequency=400 [MHz]. In graph 1101, the lack of a point indicating the CPU clock frequency=250 [MHz] when the contended access count is 2 indicates that at the CPU clock frequency=250 [MHz], access contention is resolved and the processing performance drops.

Similarly, when the contended access count is 3, if the CPU clock frequency is 250 [MHz] and the clock frequency of the device #H0 is 400[MHz], the reduction in power consumption is greatest. Therefore, in the record of the clock frequency table 301#H0 for a contended access count of 3, CPU clock frequency=250 [MHz] and the device clock frequency=400 [MHz].

Likewise, when the contended access count is 4, if the CPU clock frequency is 250 [MHz] and the clock frequency of the device #H0 is 600 [MHz], the reduction in power consumption is greatest. Therefore, in the record of the clock frequency table 301#H0 for a contended access count of 4, the CPU clock frequency=250 [MHz] and the device clock frequency-600 [MHz].

Figure 12:
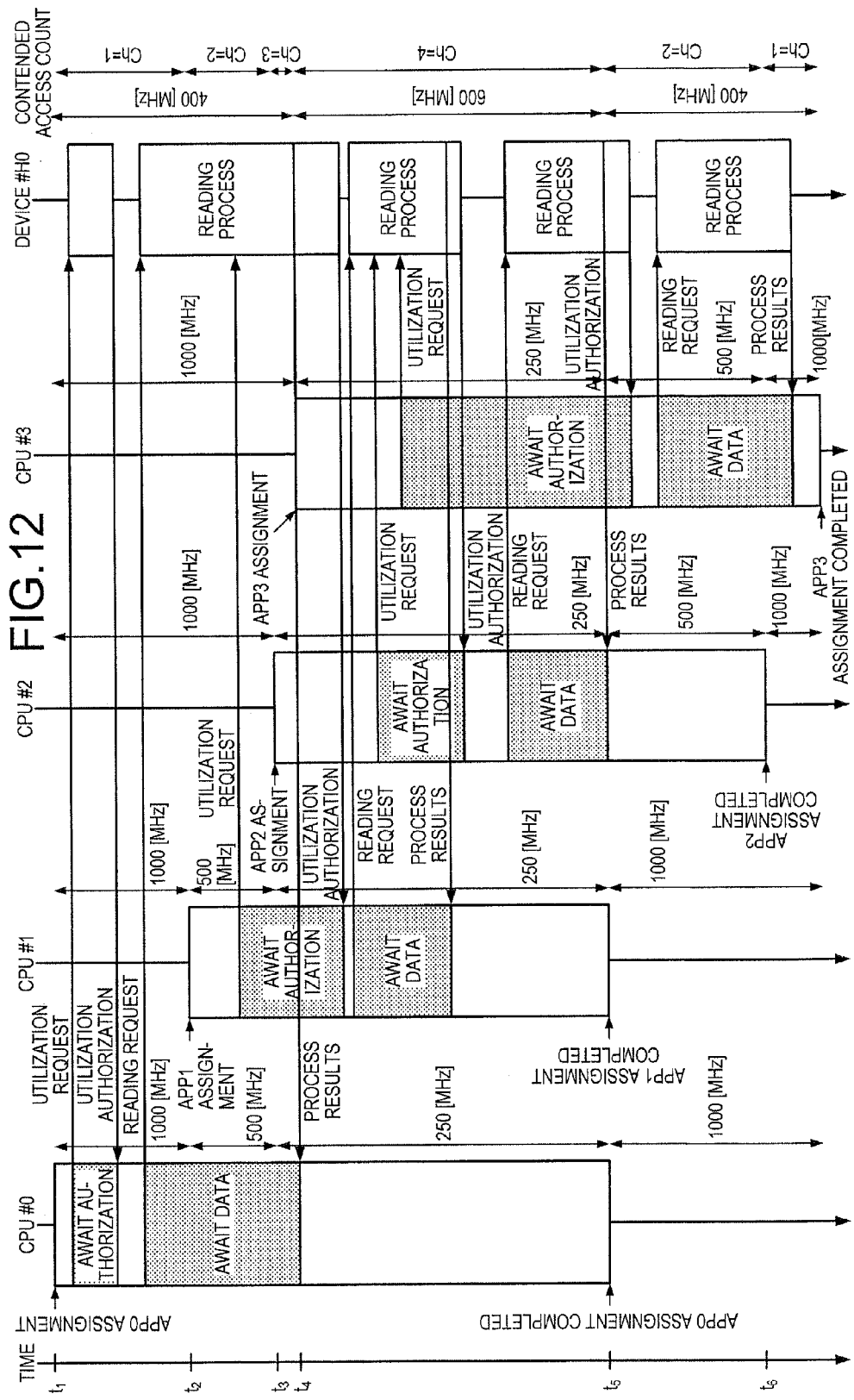
FIG. 12 is a diagram of CPUs and clock frequencies when access contention occurs at the device #H0.

Thus, the multicore processor system 100 refers to the clock frequency table 301 and the clock frequency reference value table 302, and according to the contended access count, sets the clock frequency for the CPUs contending for access among the CPUs 105 and the clock frequency for the given device. FIG. 12 depicts an example of setting the clock frequencies of the CPUs contending for access and the given device, according to the contended access count.

With reference to FIG. 11, although description has been given with respect to the device group 205 subject to arbitration by hardware, similar operations are performed for the device group 206 subject to arbitration by software, whereby a clock frequency table 301#Sx is generated. The clock frequency table 301#Sx has an exclusive access count field in place of the contended access count field.

By equation (5), the clock frequency of CPUs contending for exclusive access of the device group 206 is set to a reference value, or control to suspend operation is performed and no control is performed to lower the clock frequency. Therefore, the CPU clock frequency field of the clock frequency table 301#Sx may be omitted.

FIG. 12 is a diagram of the CPUs and clock frequencies when access contention occurs at the device #H0. In FIG. 12, the app 0 to an app 3, which frequently access the device #H0, are assumed to be assigned to the CPU #0 to the CPU #3. The communication of utilization requests, utilization authorization, reading requests, and process results between the CPU #0 to the CPU #3 and the device #H0 is identical to that described with reference to FIGS. 5 and 6; and therefore, further description is omitted with reference to FIG. 12. With reference to FIG. 12, changes in the clock frequencies of the CPUs #0 to #3 and of the device #H0 accompanying a change in the contended access count Ch will be described.

During the time $t_1$ to the time $t_2$, the CPU #0 is assigned the app 0, and the CPU #1 to the CPU #3 are assigned apps that do not frequently access the device #H0. Therefore, the contended access count Ch from the time $t_1$ to the time $t_2$ is 1 and contention does not occur. The multicore processor system 100 sets the clock frequency of the CPU #0 to the CPU #3 at 1000 [MHz] and sets the clock frequency of the device #H0 at 400 [MHz].

At the time $t_2$, when the CPU #1 is assigned the app 1, the contended access count Ch becomes 2. Therefore, at the time $t_2$, the multicore processor system 100 sets the clock frequency of the CPU #0 and the CPU #1 at 500 [MHz]. However, even when the contended access count Ch is 2, the clock frequency of the device #H0 is 400 [MHz]. Further, the clock frequency of the CPU #2 and the CPU #3, respectively executing apps that do not frequently access the device #H0, remains at 1000 [MHz].

At the time $t_3$, when the CPU #2 is assigned the app 2, the contended access count becomes 3. Therefore, at the time $t_3$, the multicore processor system 100 sets the clock frequency of the CPU #0 to the CPU #2 at 250 [MHz]. However, even when the contended access count is 3, the clock frequency of the device #H0 is 400 [MHz]. Further, the clock frequency of the CPU #3 executing an app that does not frequently access the device #H0 remains at 1000 [MHz].

At the time $t_4$, when the CPU #3 is assigned the app 3, the contended access count Ch becomes 4. Therefore, at the time $t_4$, the multicore processor system 100 sets the clock frequency of the CPU #0 to the CPU #3 at 250 [MHz]. The multicore processor system 100 further sets the clock frequency of the device #H0 at 600 [MHz].

At the time $t_5$, when the assignment of the app 0 to the CPU #0 and the assignment of the app 1 to the CPU #1 end, the contended access count Ch becomes 2. Therefore, at the time $t_5$, the multicore processor system 100 sets the clock frequency of the CPU #2 and the CPU #3 at 500 [MHz]. The multicore processor system 100 further sets the clock frequency of the device #H0 at 400 [MHz]. From the time $t_5$ and thereafter, the CPU #0 and the CPU #1 are assumed to execute apps that do not frequently access the device #H0. Therefore, the multicore processor system 100 sets the clock frequency of the CPU #0 and the CPU #1 at 1000 [MHz].

At the time $t_6$ when the assignment of the app 2 to the CPU #2 ends, the contended access count Ch becomes 1. Therefore, at the time $t_6$, the multicore processor system 100 sets the clock frequency of the CPU #3 at 1000 [MHz]. However, even when the contended access count Ch is 1, the clock frequency of the device #H0 is 400 [MHz]. From the time $t_6$ and thereafter, the CPU #2 is assumed to execute an app that does not frequently access the device #H0. Therefore, the multicore processor system 100 sets the clock frequency of the CPU #2 at 1000 [MHz].

Thus, the multicore processor system 100, with respect to contention at the device group 205, increments the contended access count Ch by 1 when an app that frequently accesses the device group 205 is assigned and decrements the contended access count Ch by 1 when the assignment has ended. Based on the contended access count Ch, the multicore processor system 100 refers to the clock frequency table 301 and sets the clock frequencies of the given device and of the CPUs contending for access.

Although not depicted, the multicore processor system 100 performs substantially identical operations with respect to contention at the device group 206 subject to arbitration by software. However, when the multicore processor system 100 receives a utilization request for the device group 206 and the CPU has no assigned app and is suspended, the multicore processor system 100 increments the exclusive access count Cs by 1. Further, upon receiving notification of utilization release and the suspension of the CPU has been released, the multicore processor system 100 decrements the exclusive access count Cs by 1.

The multicore processor system 100 uses the clock frequency table 301 and the clock frequency reference value table 302 depicted in FIG. 11 and executes the operations depicted in FIGS. 13 to 16. Although the operations of the scheduling unit 303, the exclusive access control unit 304, and the DVFS control unit 305 are executed by each of the CPUs 105, with reference to FIGS. 13 to 16, description will be given assuming that the CPU #0 executes the operations.

Figure 13:
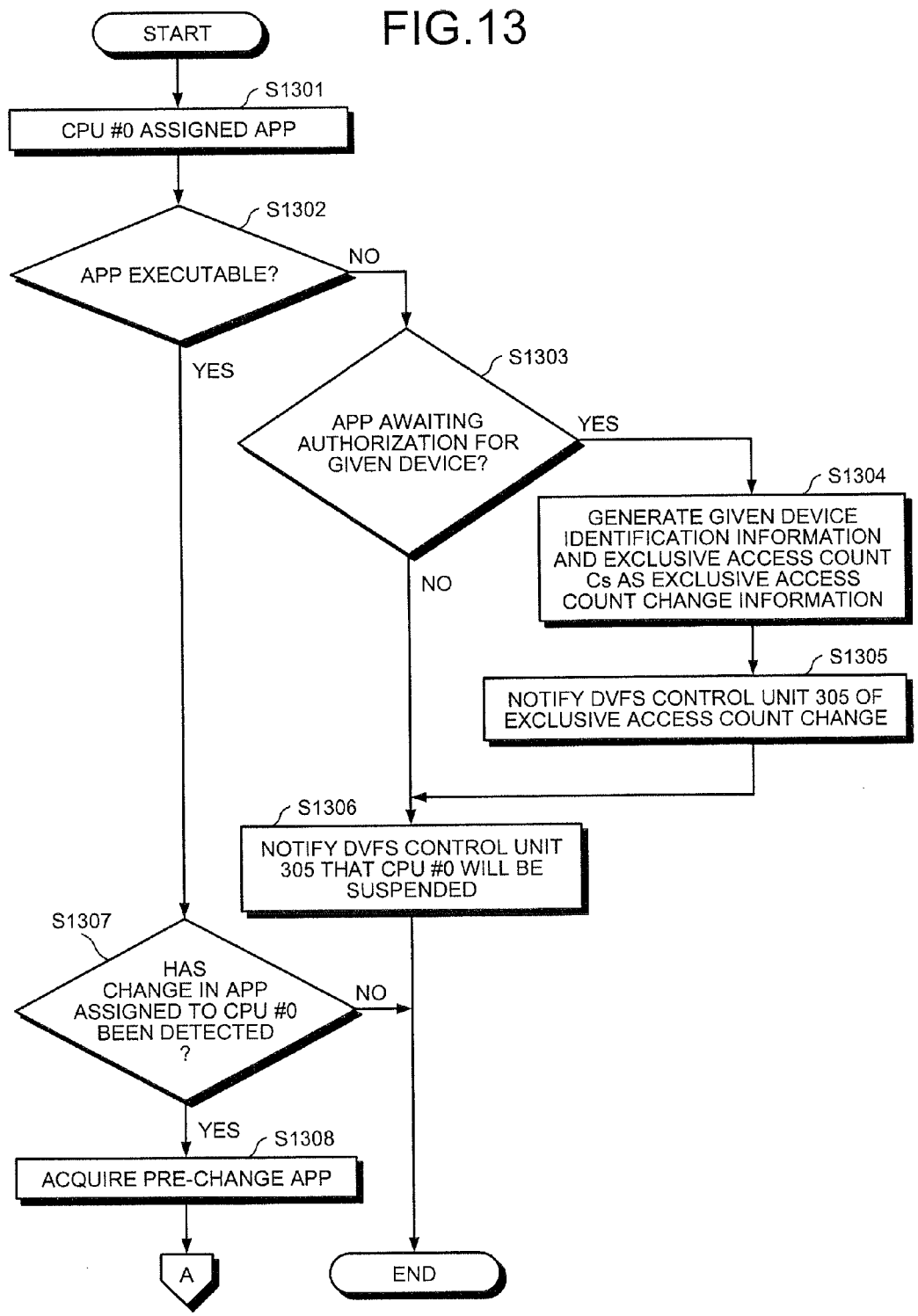
FIG. 13 is a flowchart of a first part of a process performed by a scheduling unit 303 in the first embodiment.

FIG. 13 is a flowchart of a first part of a process performed by the scheduling unit 303 in the first embodiment. The process of the scheduling unit 303 is executed each time app assignment to the CPU #0 app is determined. For example, when multiple apps are switched by time slicing, the scheduling unit 303 is executed each time the time slice period ends. Further, the scheduling unit 303 may be executed by a request from the exclusive access control unit 304.

The CPU #0 is assigned an app (step S1301). The CPU #0 determines whether the app is executable (step S1302). If the app is not executable (step S1302: NO), the CPU #0 determines whether an app is awaiting authorization for a given device (step S1303).

If an app is awaiting authorization (step S1303: YES), the CPU #0 generates given device identification information and the exclusive access count Cs as exclusive access count change information (step S1304). The route through "step S1303: YES" is for a case when, as described with reference to FIG. 15, a scheduling request from the exclusive access control unit 304 has arrived. Further, the given device identification information is information uniquely identifying the given device among the device #H0 to the device #HM, and the device #S0 to the device #SL. A name, an ID, and like may be used as the given device identification information.

The exclusive access count Cs is the number of CPUs whose operation is currently suspended consequent to awaiting access to the given device. At the time of step S1304, although the CPU #0 has not been suspended, the exclusive access count Cs at step S1304 is set to the number of CPUs that are suspended plus 1 for the CPU #0 that is soon to be suspended.

The CPU #0 notifies the DVFS control unit 305 of the exclusive access count change (step S1305). The notification data at step S1305 also includes the exclusive access count change information. If no app is awaiting authorization (step S1303: NO), or after the operation at step S1305, the CPU #0 notifies the DVFS control unit 305 that the CPU #0 will be suspended (step S1306), and the CPU #0 ends the process of the scheduling unit 303.

If the app is executable (step S1302: YES), the CPU #0 determines whether a change in the app assigned thereto has been detected (step S1307). If no change has been detected (step S1307: NO), the CPU #0 ends the process of the scheduling unit 303. A case where no change has been detected is a case where, for example, the app before the change (pre-change app) and the app after the change (post-change app) are the same app. If a change has been detected (step S1307: YES), the CPU #0 acquires the pre-change app (step S1308). The operations after this acquisition are described with reference to FIG. 14.

Figure 14:
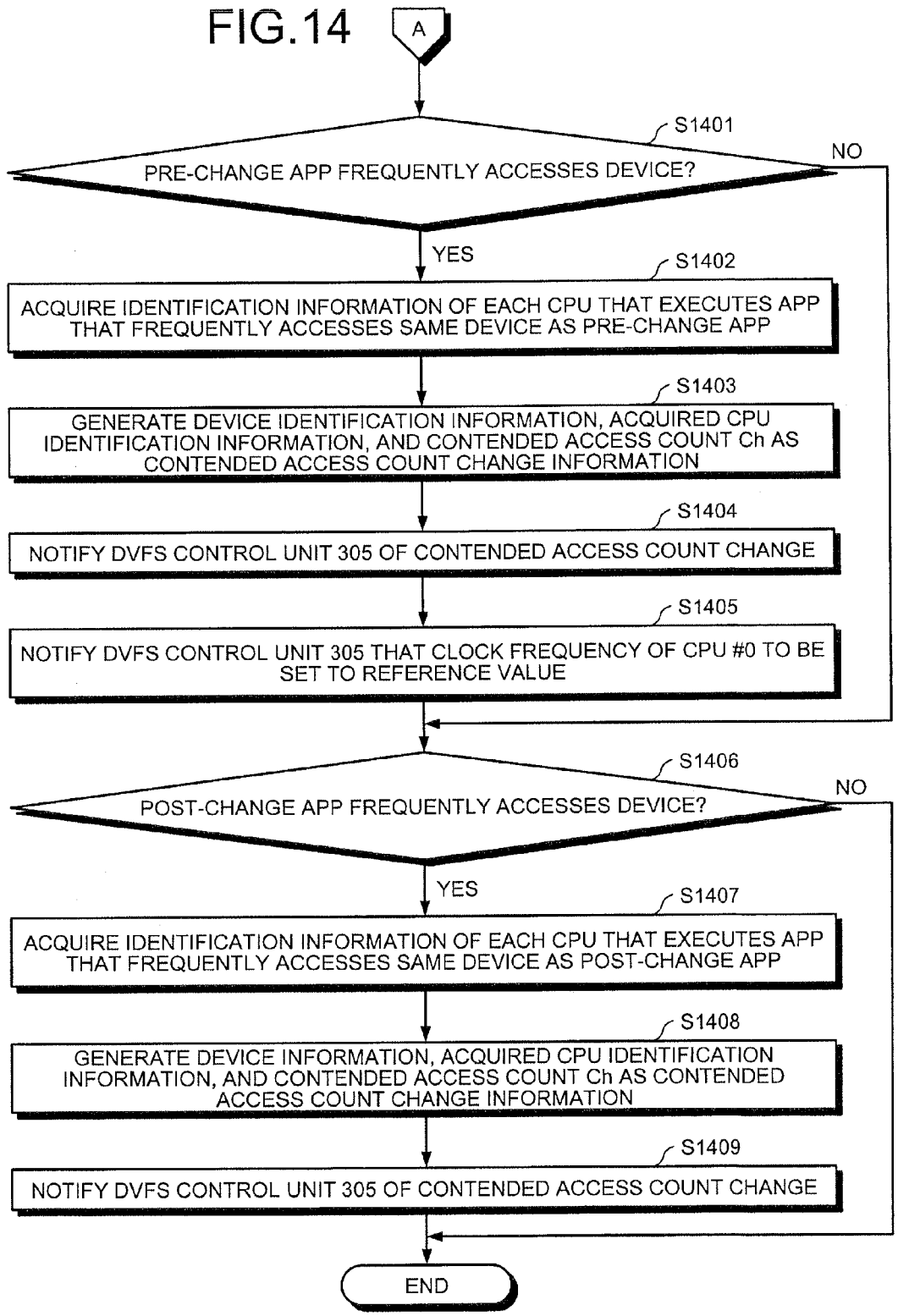
FIG. 14 is a flowchart of a second part of the process performed by the scheduling unit 303 in the first embodiment.

FIG. 14 is a flowchart of a second part of the process performed by the scheduling unit 303 in the first embodiment. After step S1308, the CPU #0 determines whether the pre-change app is an app that frequently accesses a device (step S1401). If the pre-change app is an app that frequently access a device (step S1401: YES), the CPU #0 acquires the identification information of each CPU that executes an app that frequently accesses the same device as the pre-change app (step S1402). Identification information of a CPU is information uniquely identifying the CPU. A name, an ID and the like may be used as identification information of a CPU.

The CPU #0 generates device identification information, the acquired CPU identification information, and the contended access count Ch as contended access count change information (step S1403). The CPU information is for the CPUs included in the contended access count Ch. The contended access count Ch at the time of the operation at step S1407 is the contended access count Ch before the app is assigned, less 1.

The CPU #0 notifies the DVFS control unit 305 of the contended access count change (hardware) (step S1404). The notification data at step S1404 also includes the contended access count change information. The CPU #0 notifies the DVFS control unit 305 that the clock frequency of the CPU #0 is to be set to the reference value (step S1405).

After step S1405, or if the pre-change app is not an app that frequently accesses a device (step S1401: NO), the CPU #0 determines whether the post-change app is an app that frequently accesses a device (step S1406). If the post-change app is an app that frequently accesses a device (step S1406: YES), the CPU #0 acquires the identification information of each CPU that executes an app that frequently accesses the same device as the post-change app (step S1407).

The CPU #0 generates device information, the acquired CPU identification information, and the contended access count Ch as the contended access count change information (step S1408). The CPU information is for the CPUs included in the contended access count Ch. The contended access count Ch at the time of the operation at step S1408 is the contended access count before the app is assigned (when the pre-change app is not an app that frequently accesses a device), plus 1.

The CPU #0 notifies the DVFS control unit 305 of the contended access count change (step S1409). The notification data at step S1409 also includes the contended access count change information. After step S1409, or if the post-change app is not an app that frequently accesses a device (step S1406: NO), the CPU #0 ends the process of the scheduling unit 303.

Figure 15:
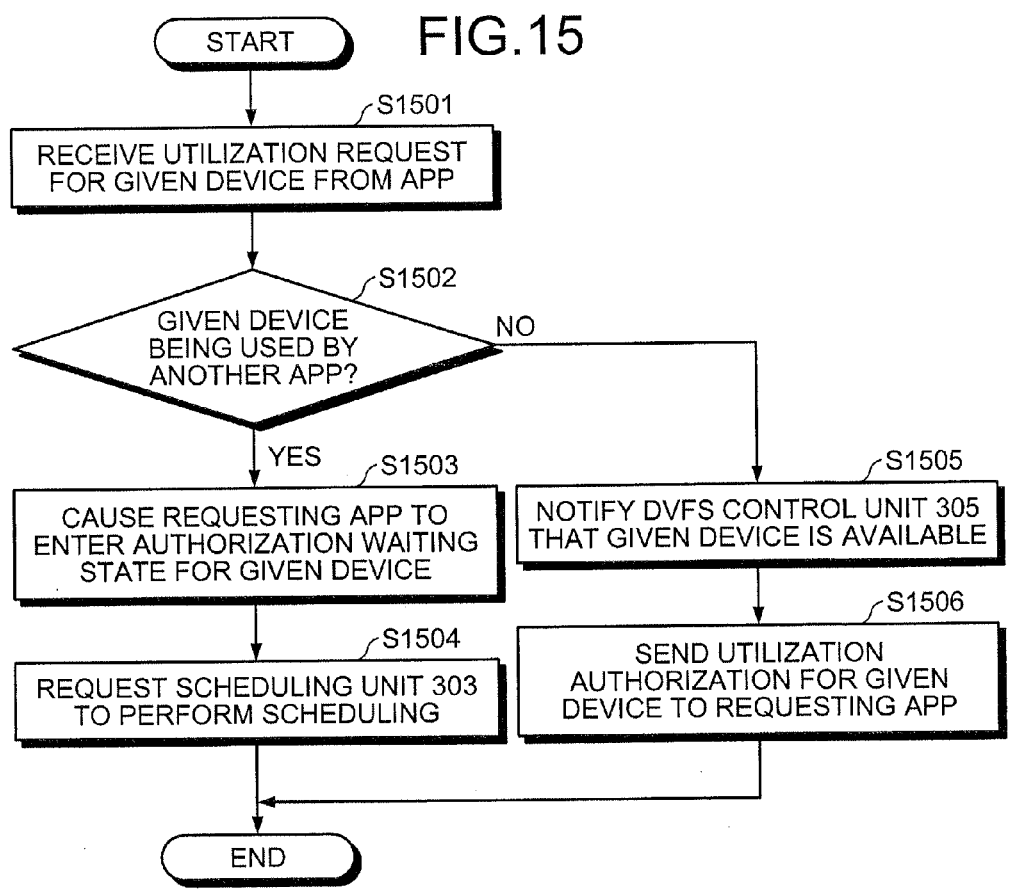
FIG. 15 is a flowchart of a utilization start process performed by an exclusive access control unit 304 in the first embodiment.

FIG. 15 is a flowchart of a utilization start process performed by the exclusive access control unit 304 in the first embodiment. The CPU #0 receives a utilization request for a given device from an app (step S1501). The CPU #0 determines whether the given device is being used by another app (step S1502). If the given device is being used by another app (step S1502: YES), the CPU #0 causes the requesting app to enter an authorization waiting state for the given device (step S1503).

The CPU #0 requests the scheduling unit 303 to perform scheduling (step S1504), and ends the utilization start process. Upon receiving the scheduling request, the scheduling unit 303 executes the operations depicted in FIGS. 13 and 14.

If the given device is not being used by another app (step S1502: NO), the CPU #0 notifies the DVFS control unit 305 that given device is available (step S1505). The notification data at step S1405 also includes the exclusive access count Cs. The exclusive access count Cs becomes 1 at the time of the operation at step S1503 because the exclusive access count Cs is 0 consequent to the given device not being under use by another app at the time of determining "NO" at step S1502. The CPU #0 sends utilization authorization for the given device to the requesting app (step S1506), and ends the utilization start process.

Figure 16:
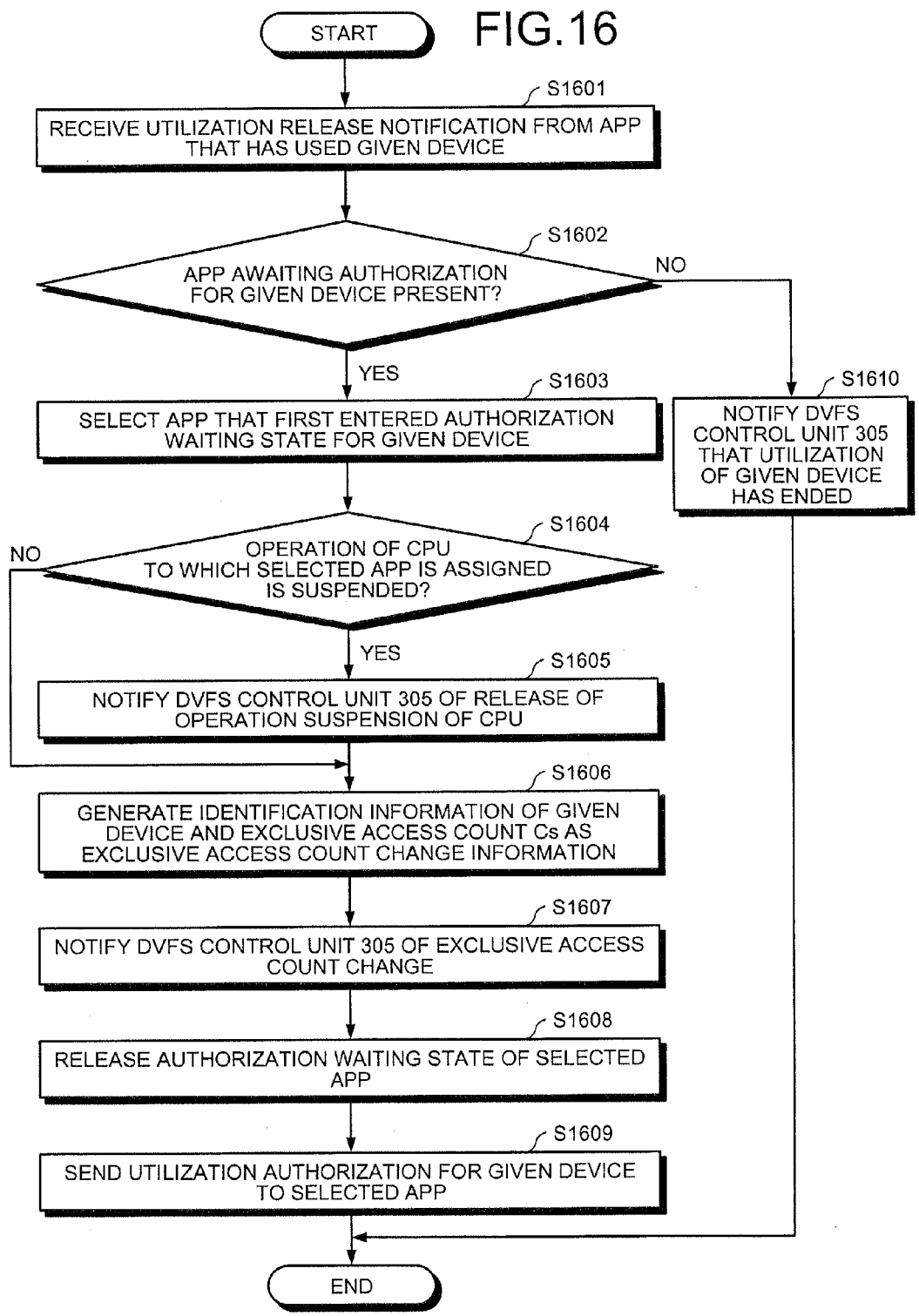
FIG. 16 is a flowchart of a utilization release process performed by the exclusive access control unit 304 in the first embodiment.

FIG. 16 is a flowchart of a utilization release process performed by the exclusive access control unit 304 in the first embodiment. The CPU #0 receives utilization release notification from an app that has used a given device (step S1601). The CPU #0 determines whether an app awaiting authorization for the given device is present (step S1602). If an app awaiting authorization is present (step S1602: YES), the CPU #0 selects the app that first entered the authorization waiting state for the given device (step S1603).

The CPU #0 determines whether the operation of the CPU to which the selected app is assigned is suspended (step S1604). If the operation of the CPU is suspended (step S1604: YES), the CPU #0 notifies the DVFS control unit 305 of the release of the operation suspension of the CPU (step S1605). After this notification, or if the operation of the CPU to which the selected app is assigned is not suspended (step S1604: NO), the CPU #0 generates identification information of the given device and the exclusive access count Cs as exclusive access count change information (step S1606). The notification data at step S1606 also includes the exclusive access count change information. The exclusive access count Cs is the exclusive access count Cs before suspension, less 1 because the suspension of the CPU is released at step S1605.

The CPU #0 notifies the DVFS control unit 305 of the exclusive access count change (step S1607). The CPU #0 releases the authorization waiting state of the selected app (step S1608). The CPU #0 sends utilization authorization for the given device to the selected app (step S1609), and ends the utilization release process. If no app is awaiting authorization for the given device (step S1602: NO), the CPU #0 notifies the DVFS control unit 305 that utilization of the given device has ended (step S1610), and ends the utilization release process.

Figure 17:
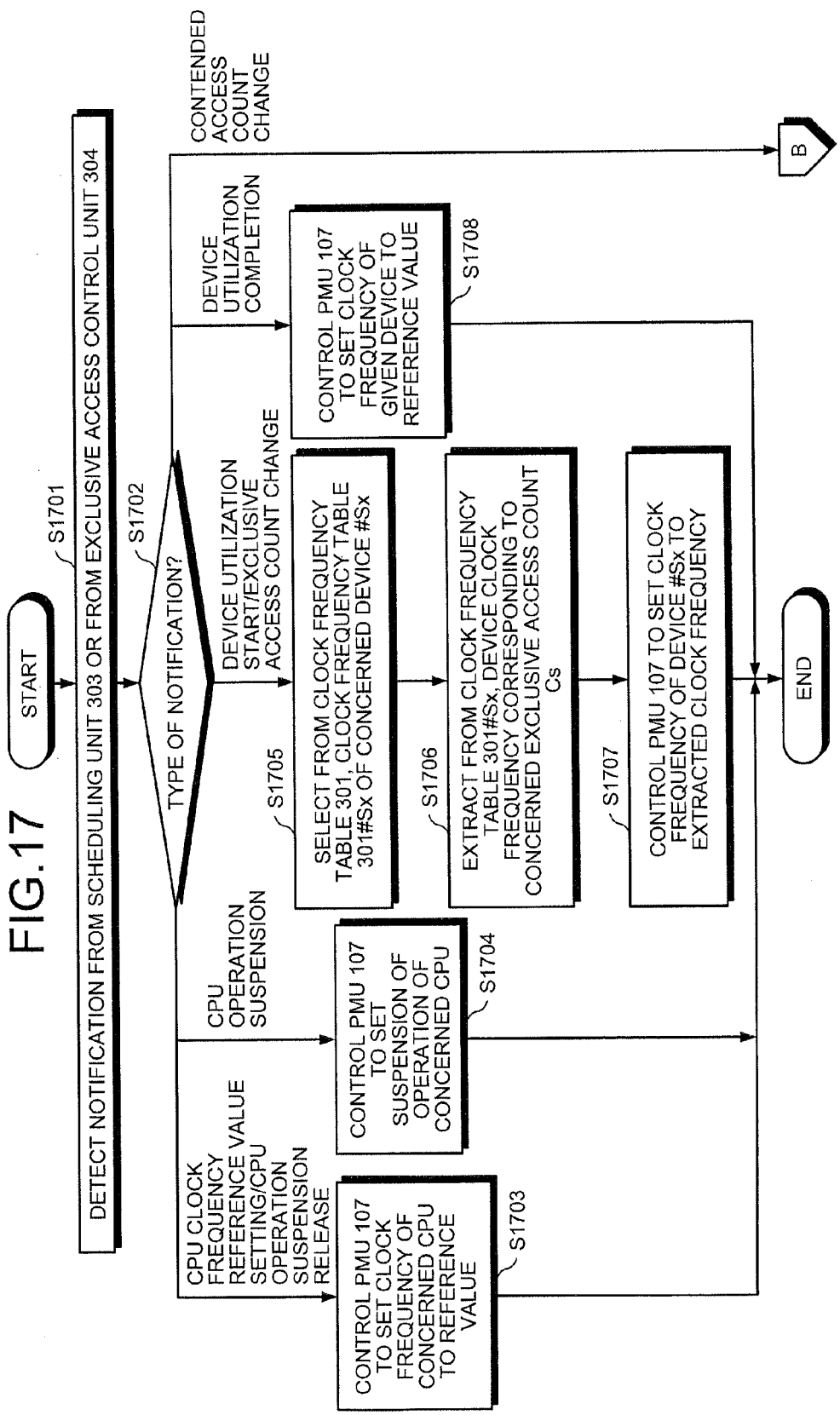
FIG. 17 is a flowchart of a first part of a process performed by a DVFS control unit 305 in the first embodiment.

FIG. 17 is a flowchart of a first part of a process performed by the DVFS control unit 305 in the first embodiment. The process of the DVFS control unit 305 is started consequent to notification by the scheduling unit 303 or the exclusive access control unit 304. The CPU #0 detects notification from the scheduling unit 303 or from the exclusive access control unit 304 (step S1701). The CPU #0 determines the type of the notification that has been detected (step S1702).

If the notification concerns a CPU clock frequency reference value setting or a CPU operation suspension release (step S1702: CPU clock frequency reference value setting/ CPU operation suspension release), the CPU #0 controls the PMU 107 to set the clock frequency of the concerned CPU to the reference value (step S1703). The operation at step S1703 is performed when notification is received consequent to the operation at step S1405 or at step S1605. The CPU #0 refers to the clock frequency reference value table 302 to set the reference value. After instructing the PMU 107, the CPU #0 ends the process of the DVFS control unit 305.

If the notification concerns CPU operation suspension (step S1702: CPU operation suspension), the CPU #0 controls the PMU 107 to set the suspension of the operation of the concerned CPU (step S1704), and ends the process of the DVFS control unit 305. The operation at step S1704 is performed when notification consequent to the operation at step S1306 is received.

If the notification concerns a device utilization start or an exclusive access count change (step S1702: Device utilization start/Exclusive access count change), the CPU #0 selects from the clock frequency table 301, the clock frequency table 301#Sx of the concerned device #Sx (step S1705). The operation at step S1705 is performed when notification consequent to the operation at step S1305 or step S1405 is received.

The CPU #0 extracts from the clock frequency table 301#Sx, the device clock frequency corresponding to the concerned exclusive access count Cs (step S1706). The CPU #0 controls the PMU 107 to set the clock frequency of the device #Sx to the extracted clock frequency (step S1707), and ends the process of the DVFS control unit 305.

If the notification concerns device utilization completion (step S1702: Device utilization completion), the CPU #0 controls the PMU 107 to set the clock frequency of the given device to the reference value (step S1708). The operation at step S1708 is performed when notification consequent to the operation at step S1610 is received. The CPU #0 refers to the clock frequency reference value table 302 to set the reference value. After instructing the PMU 107, the CPU #0 ends the process of the DVFS control unit 305. For a case where the notification concerns a contended access count change, description will be given with reference to FIG. 18.

Figure 18:
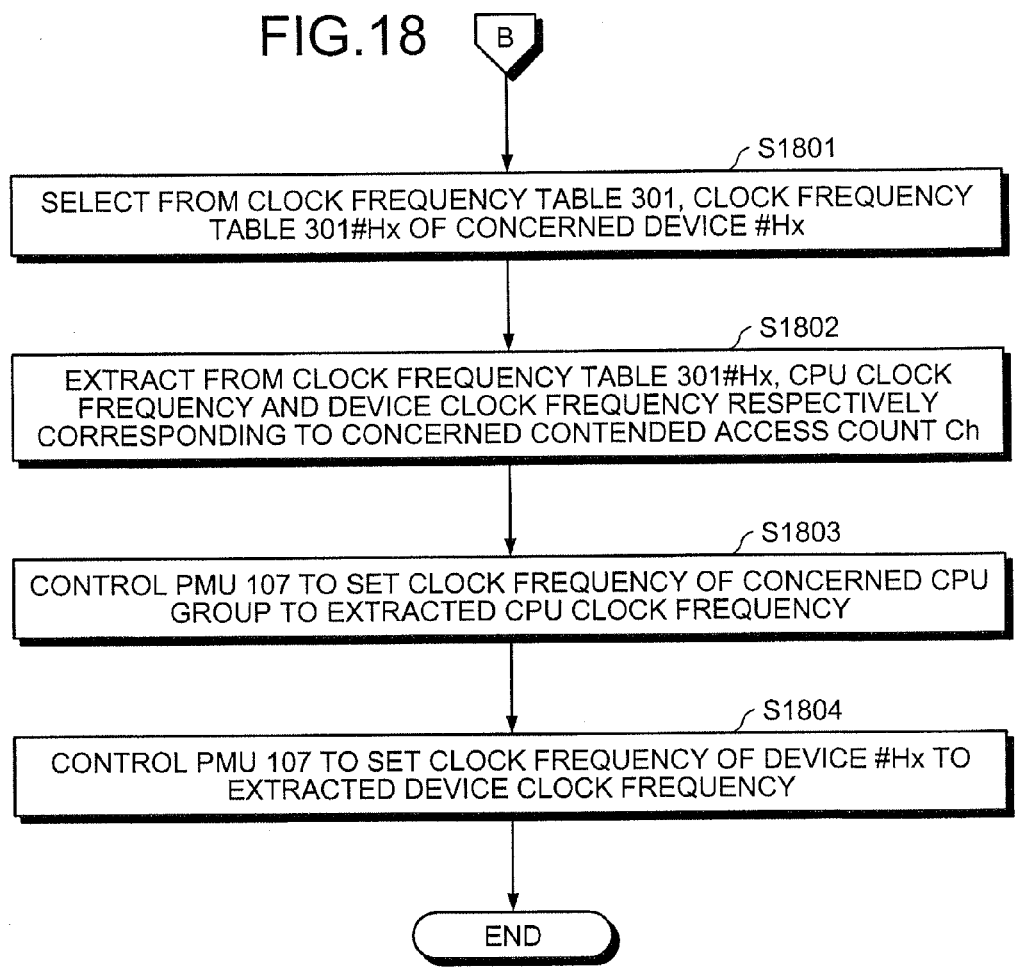
FIG. 18 is a flowchart of a second part of the process performed by the DVFS control unit 305 in the first embodiment.

FIG. 18 is a flowchart of a second part of the process performed by the DVFS control unit 305 in the first embodiment. If the notification concerns a contended access count change (step S1702: Contended access count change), the CPU #0 selects from the clock frequency table 301, the clock frequency table 301#Hx of the concerned device #Hx (step S1801). The operation at step S1801 is performed when notification consequent to the operation at step S1404 or at step S1409 is received.

The CPU #0 extracts from the clock frequency table 301#Hx, the CPU clock frequency and the device clock frequency respectively corresponding to the concerned contended access count Ch (step S1802). The CPU #0 controls the PMU 107 to set the clock frequency of the concerned CPU group to the extracted CPU clock frequency (step S1803). The CPU #0 further controls the PMU 107 to set the clock frequency of the device #Hx to the extracted device clock frequency (step S1804), and ends the process of the DVFS control unit 305.

As described, according to the multicore processor system and the power control method, when access contention by a core group occurs at a device, the device clock frequency, which causes a bottleneck, is increased and within a range that does not resolve the contention, the clock frequency of the core group is reduced. As a result, the multicore processor system can achieve power savings without drops in the overall processing performance of the multicore processor system.

The multicore processor system can reduce power consumption even when contention is unavoidable and therefore, the performance ratio with respect to power consumption can be improved. Further, by referring to a clock frequency table, the multicore processor system can determine whether reducing the processing capacity of an area with a low load or increasing the processing capacity of an area with a high load yields a greater reduction in power consumption.

If a device clock frequency is increased, the multicore processor system may set the lowest voltage enabling stable operation; and if the a core clock frequency is reduced, the multicore processor system may set the lowest voltage enabling stable operation. Since power consumption is proportional to clock frequency and voltage, the power consumption of the multicore processor system can be reduced to a greater extent as compared to changing the clock frequency. Although the multicore processor system 100 is assumed to be able to change clock frequency and voltage by DVFS control, reductions in power consumption can be achieved even if the voltage cannot be changed and only the frequency can be changed.

The clock frequency and voltage of a device and the clock frequency and voltage of a CPU may be respectively calculated based on the number of cores in the multicore processor system, the number of CPUs accessing a device, power consumption of the CPUs, and the power consumption of the devices. Consequently, the multicore processor system 100 can generate the clock frequency table 301.

The clock frequency and voltage of a CPU may be greater than a lower limit for maintaining the processing performance of a CPU that accesses a device. However, if the CPU clock frequency is the lower limit for maintaining the processing performance, the processing performance can be maintained and the overall power consumption of the multicore processor system 100 can be maximally reduced.

Device access may be contended access or exclusive access. The multicore processor system 100 can maintain processing performance and reduce power consumption with respect to contended access of a device subject to arbitration by hardware and exclusive access of a device subject to arbitration by software.

In the multicore processor system 100 according to the first embodiment, it is assumed that a single app does not simultaneously use multiple devices. Nonetheless, during operation, a single app may simultaneously use multiple devices. Therefore, the multicore processor system 100 according to a second embodiment will be described for a case where 1 app simultaneously uses multiple devices. The hardware of the multicore processor system 100 of the second embodiment is equivalent to that of the multicore processor system 100 of the first embodiment and therefore, description thereof will be omitted herein. Functions of the multicore processor system 100 according to the second embodiment will be described with reference to FIGS. 19 to 22.

Functions of the multicore processor system 100 according to the second embodiment are substantially equivalent to the functions of the multicore processor system 100 of the first embodiment depicted in FIG. 3. Hereinafter, description will be given concerning the storage unit 306, the detecting unit 307, the identifying unit 309, the extracting unit 311, and the control unit 312.

The storage unit 306 stores for each state in which 2 or more cores contend for access of at least 1 device among multiple devices, clock frequencies for multiple devices and a core group clock frequency. The clock frequencies for multiple devices are clock frequencies that cause the processing speeds of the devices to be greater than or equal to that when no access contention occurs. The core group clock frequency is a clock frequency that sustains access contention at the devices whose processing speed is greater than or equal to that when no access contention occurs and that causes the processing speed of the core group corresponding to the core count to be less than or equal to that when no access contention occurs. The storage unit 306 stores the clock frequencies as the clock frequency table 1901 depicted in FIG. 19.

The detecting unit 307 has a function of detecting for each device, a predetermined core group causing access contention at the device, among cores that access multiple devices. For example, the detecting unit 307 detects the CPU #1 and the CPU #2 causing access contention at the device #H0, and detects the CPU #0 to the CPU #2 causing detection at the device #H1. If a new CPU causing access contention with respect to the device group 205 is added, the detecting unit 307 may further detect the new CPU. Identification information of detected CPUs is stored to a storage area of a register, a cache memory, or the RAM 202 of the CPU #0.

The identifying unit 309 has a function of identifying access contention states at multiple devices by a predetermined core group detected by the detecting unit 307. For example, as access contention states of the device #H0 to the device #HM, the identifying unit 309 generates H0_CPUs to HM_CPUs, which are groups of identification information of CPUs using the device #H0 to the device #HM. The groups of CPU identification information stored in H0_CPUs to HM_CPUs are the predetermined core groups.

For example, the detecting unit 307 is assumed to detect the CPU #1 and the CPU #2 causing access contention at the device #H0, and the CPU #0 to the CPU #2 causing access contention at the device #H1. In this case, the identifying unit 309 generates H0_CPUs: the CPU #1 and CPU #2, and H1_CPUs: the CPU #0 to the CPU #2. Further, the identifying unit 309 stores NULL in H2_CPUs to HM_CPUs to indicate that no values are stored. From H0_CPUs to HM_CPUs, the detecting unit 307 generates and identifies as access contention states at multiple devices, contended access counts Ch#0 to Ch#M.

If a new CPU causing access contention with respect to the device group 205 is detected by the detecting unit 307, the identifying unit 309 may reflect the access contention state corresponding to the new CPU onto the current access contention state. The identified H0_CPUs to HM_CPUs are stored to a storage area such as on the RAM 202.

The extracting unit 311 extracts the clock frequencies corresponding to the devices of the access contention states identified by the identifying unit 309 and the clock frequency of the predetermined core group. The extracting unit 311 extracts clock frequencies corresponding to the devices and the clock frequency of the predetermined core group, from among the clock frequencies of the devices and the core group clock frequencies stored by the storage unit 306.

For example, the identifying unit 309 is assumed to identify as an access contention state of the device group 205, the contended access counts Ch#0=2 and Ch#1=3. In this case, the extracting unit 311 extracts from among records of a clock frequency table 1901, records for the contended access counts Ch#0=2 and Ch#1=3. As a result, the extracting unit 311 extracts the clock frequency of the device group 205 and the clock frequency of the predetermined CPU group included in the extracted records.

For example, the extracted records include as clock frequencies for multiple devices, values for the device #H0: 600 [MHz], the device #H1: 800 [MHz], . . . , the device #HM: 800 [MHz]. The extracted records further store as a value of the clock frequency of the predetermined CPU group, 200 [MHz], for example.

The control unit 312 has a function of causing the devices and the predetermined core group to operate at the respective clock frequencies extracted by the extracting unit 311. For example, the control unit 312 controls the PMU 107 to cause the device #H0 to operate at 600 [MHz], the device #H1 to operate at 800 [MHz], and the device #HM to operate at 800 [MHz]. The control unit 312 further controls the PMU 107 to cause the predetermined CPU group including the CPU #0 to the CPU #2 to operate at the clock frequency of 200 [MHz].

Thus, the multicore processor system 100 of the second embodiment detects for each device, a predetermined core group that causes access contention at the device, among core that access multiple devices. Further, the multicore processor system 100 stores for each state in which 2 or more cores contend for access of at least 1 device among multiple devices, clock frequencies for the devices and a core group clock frequency. The clock frequencies of the devices are clock frequencies that cause the processing speed of the devices to be greater than or equal to that when no access contention occurs. The core group clock frequency is a frequency that sustains the access contention at the devices whose processing speed is greater than or equal to that when no access contention occurs and that causes the processing speed of the core group corresponding to the core count, to be less than or equal to that when no access contention occurs.

The multicore processor system 100 identifies access contention states at multiple devices by a detected predetermined core group. The multicore processor system 100 extracts the clock frequencies corresponding to the devices of the identified access contention states and the clock frequency of the predetermined core group, from among the stored clock frequencies corresponding to the devices and the core group clock frequencies. The multicore processor system 100 causes the devices to operate at the extracted clock frequencies and causes the predetermined core group to operate at the extracted core group clock frequency.

FIG. 19 is a diagram of an example of the contents of the clock frequency table 1901 in the second embodiment. The clock frequency table 1901 in the second embodiment includes 3 fields, a contended access count field, a CPU clock frequency field, and a device clock frequency field.

The contended access count field stores contended access counts for the device group 205. A contended access count field is present for the device #H0 to the device #HM, respectively, and stores a contended access count for each device. The contended access count stores any value among 0 or 1, 2, . . . , N. The clock frequency table 1901 stores combinations of devices that are used simultaneously and therefore, has a record count of N^(M+1)−1 records. Thus, the clock frequency table 1901 can cover all states in which 2 or more CPUs contend for access of at least 1 device of the device group 205.

The CPU clock frequency field stores the CPU clock frequency for which power consumption is lowest when the device contended access count matches the device access contention stored in the contended access count field. The device clock frequency field stores the device clock frequency for which power consumption is lowest when the device contended access count matches the device contended access count stored in the contended access count field. A device clock frequency field is present for the device #H0 to the device #HM, respectively, and stores the device clock frequency.

The clock frequency table 1901 may have a field that stores the value of the lowest voltage enabling stable CPU operation when the CPU is operated at the value in the CPU clock frequency field. The clock frequency table 1901 may further have a field that stores the value of the lowest voltage enabling stable device operation when the device is operated at the value in the device clock frequency field present for the device #H0 to the device #HM, respectively, in the clock frequency table 1901.

The generation method of the clock frequency table 1901 is the same as the generation method of the clock frequency table 301 in the first embodiment. For each device contention combination, the lowest CPU clock frequency maintaining processing performance is measured and from equations (2) to (4), the clock frequency of the device group 205, for which the overall power consumption of the multicore processor system 100 is lowest is determined.

Figure 20:
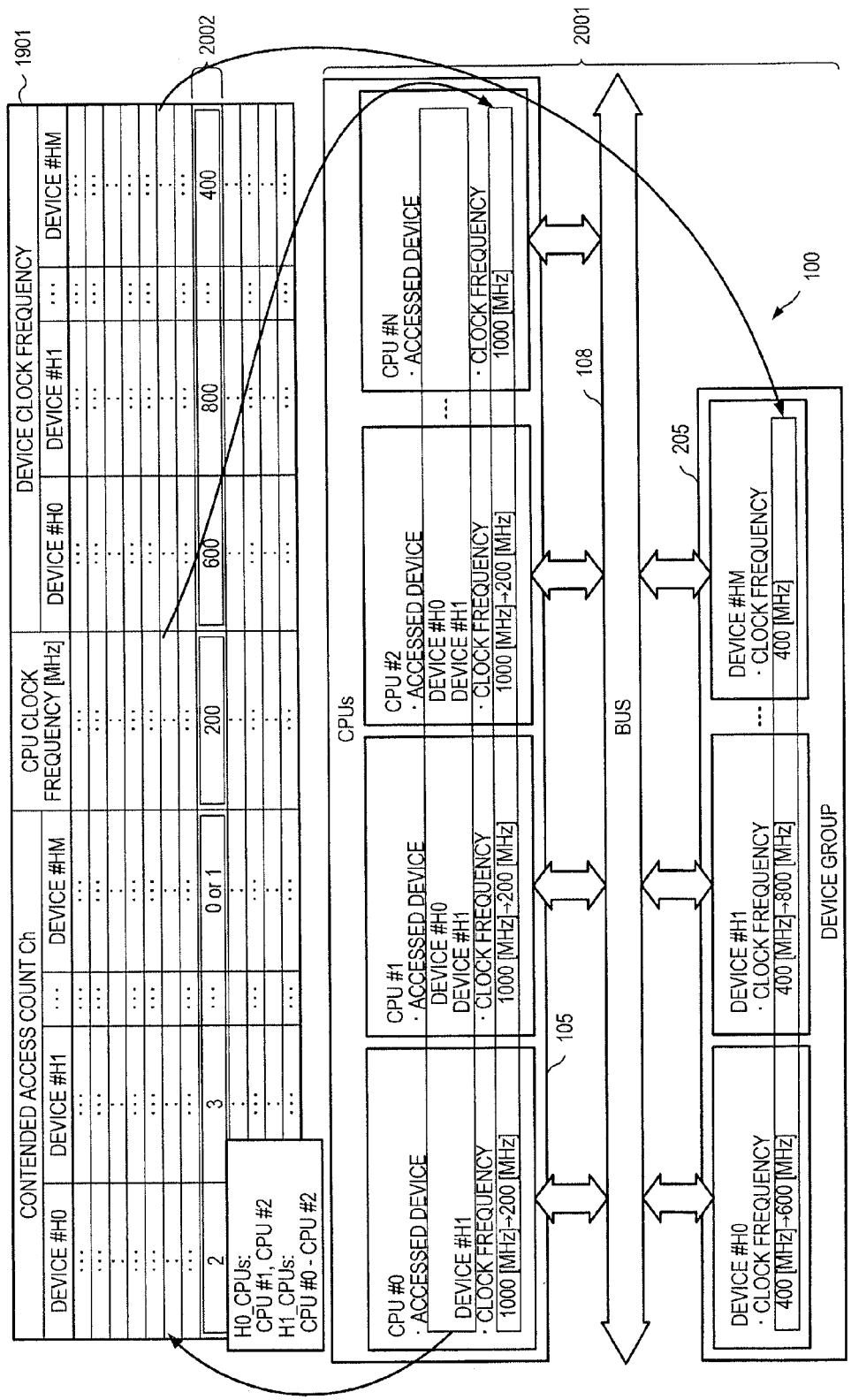
FIG. 20 is a diagram of an example of setting the clock frequencies of CPUs 105 and of the device group 205.

FIG. 20 is a diagram of an example of setting the clock frequencies of the CPUs 105 and of the device group 205. With reference to FIG. 20, an operation of extracting an applicable record from among the records of the clock frequency table 1901 will be described. In the multicore processor system 100 indicated by reference numeral 2001, the CPU #0 executes an app that frequently accesses the device #H1; and the CPUs #1 and #2 execute apps that frequently access the device #H0 and the device #H1. Other CPUs, (i.e., the CPU #3 to the CPU #N) are assumed to not be executing apps that frequently access the device group 205.

The multicore processor system 100 generates H0_CPUs to HM_CPUs, which are groups of identification information of CPUs using the device #H0 to the device #HM. H0_CPUs to HM_CPUs store the identification information of CPUs that are using the devices. In the example depicted in FIG. 20, H0_CPUs=CPUs #1 and #2; H1_CPUs=CPUs #0 to #2; and H2_CPUs to HM_CPUs=NULL.

The multicore processor system 100 calculates the contended access counts Ch#0 to Ch#M respectively of the devices, from H0_CPUs to HM_CPUs. The contended access counts Ch are element counts of H0_CPUs to HM_CPUs. In the example depicted in FIG. 20, Ch#0=2, Ch#1=3, and Ch#2 to Ch#M are each 0. Therefore, the multicore processor system 100 extracts the record 2002 from among the records of the clock frequency table 1901. If the contended access count of a given device is 1, contention is not occurring and therefore, a record in which the contended access count of the given device is 0 is extracted.

The multicore processor system 100 changes the clock frequency of the CPU #0 to the CPU #2 from 1000 [MHz] to 200 [MHz], according to the extracted record. Similarly, the multicore processor system 100 changes the clock frequency of the device #H0 from 400 [MHz] to 600 [MHz] and changes the clock frequency of the device #H1 from 400 [MHz] to 800 [MHz].

In FIG. 20, a case in which a single app uses multiple device groups 205 is described. In a case in which a single app uses multiple device groups 206, the app can acquire and release utilization right by a single execution of an exclusive process.

For example, when acquiring utilization right, the CPU #0 suffices to notify (by the operation at step S1405) the DVFS control unit 305 of the start of use of given devices, a number of times corresponding to the number of given devices. An exclusive access count Cs for each devices of the device group 206 is retained and the CPU #0 notifies the DVFS control unit 305 of the exclusive access count Cs corresponding to the given devices. According to the exclusive access count Cs, the DVFS control unit 305 extracts the clock frequency of a given device from the clock frequency table 301 of the given device. When releasing utilization right, the CPU #0 suffices to notify (by the operation at step S1610) the DVFS control unit 305 of the end of use of the given devices, a number of times corresponding to the number of given devices.

Even in a case in which the exclusive access count changes, the CPU #0 suffices to notify (by the operations at step S1305 and step S1607) the DVFS control unit 305 of the exclusive access count change, a number of times corresponding to the number of given devices.

The multicore processor system 100 uses the clock frequency table 1901 and executes the process of the scheduling unit 303 depicted in FIG. 21 and the process of the DVFS control unit 305 depicted in FIG. 22. Further, although the process of the scheduling unit 303 and the process of the DVFS control unit 305 in the second embodiment may be executed by each of the CPUs 105, with reference to FIGS. 21 and 22, description is given assuming that the CPU #0 executes the processes.

FIG. 21 is a flowchart of the second part of the process of the scheduling unit 303 in the second embodiment. Concerning the first part of the process of the scheduling unit 303 in the second embodiment, the operations are equivalent to those in the first part of the process of the scheduling unit 303 in the first embodiment, excluding the process at step S1305 and therefore, further description is omitted. Further, the operation corresponding to step S1305 of the scheduling unit 303 in the second embodiment is the operation of giving notification of exclusive access count changes to the DVFS control unit 305 a number of times equivalent to the number of given devices, as described above.

The CPU #0 determines whether the pre-change app is an app that accesses a device frequently (step S2101). If the pre-change app is an app that frequently accesses a device (step S2101: YES), the CPU #0 notifies the DVFS control unit 305 that the clock frequency of the CPU #0 is to be set at the reference value (step S2102). After this notification or if the pre-change app is not an app that frequently accesses a device (step S2101: NO), the CPU #0 determines whether the pre-change app or the post-change app are apps that frequently access a device (step S2103).

If the pre-change app or the post-change app are apps that frequently access a device (step S2103: YES), the CPU #0 acquires as a post-change device group, the device group that is frequently accessed by the post-change app (step S2104). If the post-change app is not an app that frequently accesses a device, the post-change device group is an empty set.

The CPU #0 generates identification information of the CPU #0 and the post-change device group as contended access count change information (step S2105). The CPU #0 notifies the DVFS control unit 305 of the contended access count change (step S2106), and ends the process of the scheduling unit 303. If neither the pre-change app nor the post-change app are apps that frequently access a device (step S2103: NO), the CPU #0 ends the process of the scheduling unit 303.

FIG. 22 is a flowchart of the second part of the process of the DVFS control unit 305 in the second embodiment. Concerning the first part of the process of the DVFS control unit 305 in the second embodiment, the operations are equivalent to those in the first part of the process of the DVFS control unit 305 in the first embodiment and therefore, further description thereof is omitted.

If the notification concerns a contended access count change, the CPU #0 determines whether H0_CPUs to HM_CPUs are stored (step S2201). If H0_CPUs to HM_CPUs are not stored (step S2201: NO), the CPU #0 stores the respective values of H0_CPUs to HM_CPUs as NULL (step S2202). The storage location is a storage area such as the RAM 202.

After completion of the storage or if H0_CPUs to HM_CPUs are stored (step S2201: YES), the CPU #0 deletes from H0_CPUs to HM_CPUs, the identification information of the concerned CPUs (step S2203). For example, the CPU #0 is assumed to be notified that H0_CPUs=CPUs #0 and #3; H1_CPUs-CPUs #0 to #2; and H2_CPUs to HM_CPUs-NULL. In this case, the CPU #0 sets H0_CPUs=CPU #3; H1_CPUs=CPUs #1 and #2; and H2_CPUs to HM_CPUs=NULL.

The CPU #0 adds the identification information of the concerned CPUs to the storage area of the concerned post-change device group, among H0_CPUs to HM_CPUs (step S2204). For example, assuming that H0_CPUs=CPU #3; H1_CPUs=CPUs #1 and #2; and H2_CPUs to HM_CPUs-NULL; and that the post-change device group includes the devices #H1 and #H2, in this case, if the concerned CPU is the CPU #0, the CPU #0 sets H0_CPUs=CPU #3; H1_CPUs-CPU #0 to CPU #2; H2_CPUs=CPU #0; and H3_CPUs to HM_CPUs=NULL.

The CPU #0 generates the contended access counts Ch#0 to Ch#M from H0_CPUs to HM_CPUs (step S2205). For example, assuming that H0_CPUs=CPU #3; H1_CPUs=CPUs #0 to #2; H2_CPUs=CPU #0; and H3_CPUs to HM_CPUs-NULL, in this case, the CPU # generates the contended access counts as Ch#0=1, Ch#1=3, Ch#2=1, and Ch#3 to Ch#M=0.

After performing incrementing, the CPU #0 extracts from among the records of the clock frequency table 1901, a record in which the values of the contended access count fields all match the values of the generated contended access counts Ch#0 to Ch#M (step S2206). The CPU #0 controls the PMU 107 to set the clock frequency of the CPUs frequently accessing a device group for which the contended access counts Ch#0 to Ch#M are 2 or greater, to the value of the CPU clock frequency in the extracted record (step S2207).

For example, if the contended access counts are Ch#0=1, Ch#1=3, Ch#2=1, and Ch#3 to Ch#M=0, the device group for which CH is 2 or greater is the device #H1. If the CPU #0 refers to H1_CPUs and the CPUs that frequently access the device #H1 and the CPU #0 to the CPU #2 are included, the CPU #0 controls the PMU 107 to set the clock frequency of the CPU #0 to the CPU #2 to the value of the CPU clock frequency in the extracted record.

The CPU #0 determines whether all of the CPUs that access a device having a contended access count Ch of 1 are among H0_CPUs to HM_CPUs, accessing a device for which the contended access count is 2 or greater (step S2208). If such a CPU is not among H0_CPUs to HM_CPUs, accessing a device for which the contended access count is 2 or greater (step S2208: NO), the CPU #0 controls the PMU 107 to set the clock frequency of each CPU accessing only a device for which the contended access count Ch is 1, to be the reference value (step S2209).

For example, assuming H0_CPUs=CPU #3, H1_CPUs=CPU #0 to #2, H2_CPUs=CPU #0, and H3_CPUs to HM_CPUs=NULL; and Ch#0=1, Ch#1=3, Ch#2=1, and Ch#3 to Ch#M=0. The CPU #0 extracts the CPU #3, which accesses the device #H0 for which the contended access count Ch is 1, and the CPU #0, which accesses the device #H2.

The CPU #0 determines whether the CPU #3 and the CPU #0 are among H1_CPUs that access the device #H1 having a contended access count of 2 or greater. Although the CPU #0 is among H1_CPUs, the CPU #3 is not. Therefore, the CPU #3 is a CPU that accesses only a device for which the contended access count Ch is 1. As a result, the CPU #0 performs control such that the clock frequency of the CPU #3 is set at the reference value.

If all such CPUs are among H0_CPUs to HM_CPUs, accessing a device for which the contended access count is 2 or greater (step S2208: YES) or after the operation at step S2209, the CPU #0 controls the PMU 107 to set the clock frequency of the device group 205 to the value in the device clock frequency field of the extracted record (step S2210). The CPU #0 ends the process of the DVFS control unit 305.

As described, according to the multicore processor system and the power control method, when a core simultaneously accesses multiple devices, a contention state at multiple devices is identified, where the devices and the contending cores are operated at clock frequencies corresponding to the identified state. Consequently, the multicore processor system can perform operation in a state that maximally reduces power consumption without drops in processing performance, even when the contention of multiple devices is in a combined state.

The power control method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

According to the multicore processor system and the power control method, processing performance can be maintained while power consumption is reduced when cores contend for access of a device.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A multicore processor system comprising:
    a plurality of processors;
    a device;
    a memory configured to store a clock frequency table that indicates, according to an access count that is a number of processors accessing the device, device voltage values and device clock frequencies for which power consumption becomes lowest, and processor voltage values and processor clock frequencies for the processors accessing the device; and
    a power control unit configured to control a voltage and a clock frequency of the processors based on the clock frequency table stored in the memory when a number of the processors accessing the device changes,
    wherein when the number of processors accessing the device changes,
    read from the memory a device clock frequency and a device voltage value corresponding to the number of processors accessing the device, and a processor clock frequency and a processor voltage value for the processors accessing the device;
    set the device to operate at the read device clock frequency and the read device voltage value; and
    set each processor accessing the device to operate at the read processor clock frequency and the read processor voltage value; and
    wherein the clock frequency table further comprises fields for a contended access count, a central processing unit (CPU) clock frequency, a CPU voltage, a device clock frequency, and a device voltage, each field corresponding to the number of processors accessing the device, the processor clock frequencies, the processor voltage values, the device clock frequencies, and the device voltage values, respectively.

2. The multicore processor system according to claim 1, wherein the processor clock frequencies and the processor voltage values are calculated based on the number of the processors, the number of the processors accessing the device, the power consumption of at least one processor among the processors, and the power consumption of the device.

3. The multicore processor system according to claim 1, wherein the processor clock frequencies and the processor voltage values are greater than a lower limit for maintaining processing performance of each processor accessing the device.

4. The multicore processor system according to claim 1, wherein access of the device includes contended access and exclusive access.

5. A power control method of a multicore processor system and executed by a computer, the power control method comprising:
    reading information of clock frequency and voltage from a clock frequency table stored in a memory, the clock frequency table being configured to indicate, according to an access count that is a number of processors accessing a device, device voltage values and device clock frequencies for which power consumption becomes lowest, and processor voltage values and processor clock frequencies for the processors accessing the device; and
    setting the processors accessing the device to operate according to the read information of clock frequency and voltage from the memory when a number of the processors accessing the device changes,
    wherein when the number of processors accessing the device changes,
    reading from the memory a device clock frequency and a device voltage value corresponding to the number of processors accessing the device, and a processor clock frequency and a processor voltage value for the processors accessing the device;
    setting the device to operate at the read device clock frequency and the read device voltage value; and setting each processor accessing the device to operate at the read processor clock frequency and the read processor voltage value; and wherein the clock frequency table further comprises fields for a contended access count, a central processing unit (CPU) clock frequency, a CPU voltage, a device clock frequency, and a device voltage, each field corresponding to the number of processors accessing the device, the processor clock frequencies, the processor voltage values, the device clock frequencies, and the device voltage values, respectively.

6. The power control method according to claim 5, wherein the processors are further configured to access the device by contended access.

7. The power control method according to claim 5, wherein the processors are further configured to access the device by exclusive access.

* * * * *